(12) United States Patent
Mansfield et al.

(10) Patent No.: US 9,111,327 B2
(45) Date of Patent: Aug. 18, 2015

(54) TRANSFORMING GRAPHIC OBJECTS

(75) Inventors: Philip Andrew Mansfield, Vancouver (CA); Michael Robert Levy, Vancouver (CA)

(73) Assignee: APPLE INC., Cupertino, CA (US)

( * ) Notice: Subject to any disclaimer, the term of this patent is extended or adjusted under 35 U.S.C. 154(b) by 825 days.

(21) Appl. No.: 13/106,805

(22) Filed: May 12, 2011

(65) Prior Publication Data

US 2012/0182318 A1    Jul. 19, 2012

Related U.S. Application Data

(60) Provisional application No. 61/433,951, filed on Jan. 18, 2011, provisional application No. 61/433,957, filed on Jan. 18, 2011.

(51) Int. Cl.
*G06T 3/00*    (2006.01)

(52) U.S. Cl.
CPC ................ *G06T 3/00* (2013.01); *G06T 3/0006* (2013.01)

(58) Field of Classification Search
USPC .......................... 345/647, 505, 649; 358/1.18
See application file for complete search history.

(56) References Cited

U.S. PATENT DOCUMENTS

| | | | |
|---|---|---|---|
| 5,553,157 A | 9/1996 | Bourguignon et al. | |
| 5,724,494 A | 3/1998 | Politis | |
| 5,861,886 A | 1/1999 | Moran et al. | |
| 5,987,171 A | 11/1999 | Wang | |
| 6,345,279 B1 | 2/2002 | Li et al. | |
| 6,377,285 B1 | 4/2002 | Doan et al. | |
| 6,480,203 B1 | 11/2002 | Carter et al. | |
| 6,490,696 B1 * | 12/2002 | Wood et al. | 714/38.1 |
| 6,504,544 B1 | 1/2003 | Hollingsworth et al. | |
| 6,512,522 B1 | 1/2003 | Miller et al. | |
| 6,549,199 B1 | 4/2003 | Carter et al. | |
| 6,562,077 B2 | 5/2003 | Bobrow et al. | |
| 6,577,777 B1 | 6/2003 | Yoshino et al. | |
| 6,687,404 B1 | 2/2004 | Hull et al. | |
| 6,826,727 B1 | 11/2004 | Mohr et al. | |
| 6,938,204 B1 | 8/2005 | Hind et al. | |
| 7,027,071 B2 | 4/2006 | Chao | |
| 7,295,711 B1 | 11/2007 | Ahuja et al. | |
| 7,433,517 B2 | 10/2008 | Kato et al. | |
| 7,461,349 B1 | 12/2008 | Sharma et al. | |
| 7,629,987 B1 * | 12/2009 | De Waal | 345/649 |
| 7,647,552 B2 | 1/2010 | Wan | |

(Continued)

FOREIGN PATENT DOCUMENTS

WO    WO 2009/039641    4/2009

OTHER PUBLICATIONS

U.S. Appl. No. 13/106,803, filed May 12, 2011, Mansfield, Philip Andrew, et al.

(Continued)

*Primary Examiner* — Phi Hoang
(74) *Attorney, Agent, or Firm* — Adeli LLP

(57) ABSTRACT

Some embodiments provide a method for applying a transform to a graphic object in order to display the graphic object. The method receives a transform to apply to the graphic object. The method decomposes the transform into several primitive transforms. For each of the several primitive transforms, the method applies the primitive transform to the graphic object according to a pre-defined parameter for the graphic object. The method displays the transformed graphic object.

27 Claims, 22 Drawing Sheets

(56) References Cited

U.S. PATENT DOCUMENTS

| | | | |
|---|---|---|---|
| 7,809,195 | B1 | 10/2010 | Greene |
| 7,814,419 | B2 | 10/2010 | Fabritius |
| 8,365,072 | B2 | 1/2013 | Mansfield et al. |
| 8,478,051 | B2 * | 7/2013 | Sibiryakov ............. 382/209 |
| 2003/0098872 | A1 * | 5/2003 | Georgiev ............... 345/647 |
| 2004/0054692 | A1 | 3/2004 | Seyrat et al. |
| 2004/0145593 | A1 | 7/2004 | Berkner et al. |
| 2004/0146199 | A1 | 7/2004 | Berkner et al. |
| 2005/0283739 | A1 | 12/2005 | Mohr et al. |
| 2006/0022955 | A1 | 2/2006 | Kennedy |
| 2006/0114260 | A1 * | 6/2006 | Diard .................... 345/505 |
| 2006/0184532 | A1 | 8/2006 | Hamada et al. |
| 2006/0288278 | A1 | 12/2006 | Kobayashi |
| 2008/0231643 | A1 | 9/2008 | Fletcher et al. |
| 2009/0067753 | A1 * | 3/2009 | Hanechak ............... 382/298 |
| 2009/0123089 | A1 | 5/2009 | Karlov et al. |
| 2009/0310888 | A1 * | 12/2009 | Szeliski et al. ......... 382/298 |
| 2010/0091330 | A1 * | 4/2010 | Marchesotti et al. ...... 358/1.18 |
| 2010/0174982 | A1 | 7/2010 | Mansfield et al. |
| 2010/0315424 | A1 | 12/2010 | Cai |
| 2012/0113125 | A1 * | 5/2012 | Guerrab et al. .......... 345/473 |
| 2012/0182317 | A1 | 7/2012 | Mansfield et al. |
| 2013/0185631 | A1 | 7/2013 | Mansfield et al. |

OTHER PUBLICATIONS

Portions of prosecution history of U.S. Appl. No. 13/106,803, filed Jul. 14, 2011, Mansfield, Philip Andrew, et al.

* cited by examiner

TRANSFORMING GRAPHIC OBJECTS

CLAIM OF BENEFIT TO PRIOR APPLICATIONS

This application claims the benefit of U.S. Provisional Application 61/433,951, entitled "Reconstruction of Lists, Ordering Page Content, Storing Multiple Representations for a Document, and Adaptive Graphic Objects", filed Jan. 18, 2011, and U.S. Provisional Application 61/433,957, entitled "Adaptive Graphic Objects", filed Jan. 18, 2011. U.S. Provisional Applications 61/433,951 and 61/433,957 are incorporated herein by reference.

CROSS REFERENCE TO RELATED APPLICATIONS

This Application is related to the following application: U.S patent application Ser. No. 13/106,803, filed May 12, 2011.

BACKGROUND

When rendering a layout of objects on a display device (e.g., a computer screen), various geometric transforms may be applied to the objects in the layout. In general, objects (images, paths, surfaces, etc.) are first defined, then one or more transforms are applied. The transformed objects are grouped with other graphic objects to which other transforms may have been applied, and additional transforms may be applied to the group. Additional layers of grouping and transforming may be applied.

However, in some situations, one will not want to perform certain transformations on certain objects. To solve this issue currently, each object in a user interface is transformed separately. However, this is an inefficient solution, as it requires many of the same transforms to be applied to a large number of objects repeatedly. Furthermore, it prevents graphic objects from being easily grouped into reusable packages with a structure that may be opaque to a later software developer, because the software developer may want transformation to affect the different graphic objects differently.

BRIEF SUMMARY

Some embodiments of the invention provide a novel structure for grouping multiple graphic objects (e.g., shapes, images, paths, surfaces, glyphs, etc.) into a single reusable data structure, or object, in which the different graphic objects may be affected differently by a single transform. Some embodiments also provide a method for applying the transform to such a grouped set of graphic objects that are part of a graphical layout in order to display the graphical layout in a transformed state. The method decomposes the transform into a set of primitive transforms and applies the primitive transforms in a particular order to the graphic objects according to settings of the graphic objects.

In some embodiments, the transform is a matrix operation that belongs to a particular class of transforms. For example, the transform could belong to the class of 2D affine transforms, which are transforms in two dimensions that preserve collinearity and distance ratios along a line. Additional classes of transforms include higher dimension affine transforms as well as various types of non-affine transforms in two or more dimensions.

A set of primitive transforms for a particular transform class is a canonical composition of matrix operations for the matrix representation of a generic transform of the particular transform class. That is, the set of primitive transforms for a particular transform class, when applied to a point in space (e.g., an (x, y) coordinate in two dimensions) in a particular order, can be shown to have the same result as applying the generic transform. Some transform classes may have multiple possible sets of primitive transforms, therefore the method of some embodiments defines a particular set of such primitive transforms for a particular transform class in advance, in order to define graphic object parameters in terms of the particular set of primitive transforms.

As mentioned, the composition of primitive transforms may require the set of primitive transforms to be applied in a particular order. For instance, if the transforms do not commute, then the composition may give different results if the primitive transforms are applied in a different order.

One example of a set of primitive transforms is a set of five transforms for the class of 2D affine transforms. Any transform in this class, as applied to a graphic object, may be decomposed into a composition of (i) reflection about an axis through the graphic object's center at a first particular angle, (ii) rotation about the graphic object's center at a second particular angle, (iii) distortion by stretching by a first factor along an axis through the graphic object's center at a third particular angle and squeezing by a second factor along an axis through the graphic object's center perpendicular to the third particular angle, (iv) scaling about the graphic object's center by a third factor, and (v) translating the object by a particular vector. Some embodiments apply these primitive transforms in the particular order given above (i.e., with reflection first and translation last).

When applying a transform to a graphic object in the graphical layout, the method of some embodiments initially decomposes the transform into its primitive factors as defined for the transform class to which the transform belongs. For instance, in the example of 2D affine transforms, the method of some embodiments identifies the reflection, rotation, distortion, scaling, and translation factors of the given transform.

The method then determines which of the primitive transforms affect the graphic object. In some embodiments, each graphic object has an associated set of participation states that indicate which transforms affect the graphic object. For instance, many user interface items should not scale when a user zooms in on a layout and should not translate when a user moves a layout, while other items participate in one or both of these transforms. Some embodiments define the participation states for a graphic object as an array of binary values (e.g., an array of five values for the 2D affine transform primitives discussed above).

The method applies to the graphic object only the transforms in which the object participates. This may involve generating a new transforms from the primitive factors for the given transform in which the object participates. For instance, if the object only participates in the translation and scaling primitives, then the method will generate a new transform that is a composition of these two primitives and apply this new transform to the graphic object.

The reusable group of graphic objects may be stored as a single adaptive drawing object that defines the relationships between the individual graphic objects through the use of such transforms and sets of participation states. The adaptive drawing object of some embodiments stores the group of graphic objects as well as operations to perform on the graphic objects in order to define these relationships. In some embodiments, these operations may include grouping operations, transforms to a graphic object or a grouped set of graphic objects, and modifications to the participation states of one or more of the graphic objects. The grouping operations allow for efficiencies to be gained by not having to store the same transform or participation state change multiple times for the same adaptive drawing object. The end result of such a set of operations will be a transform for each graphic object as well as a set of output participation states for one or more classes of transform.

These output participation states are used when an external software agent applies a transform to the adaptive drawing object, in the manner described above. In some embodiments, the transform is received as a result of user interaction with a device on which the graphical layout is displayed. A user might interact with one of the graphic objects in the layout (e.g., via a touchscreen, cursor controller, etc.) or with the device generally in order to initiate the application of the transform. After applying the transform to the various graphic objects in the layout according to the participation states of those objects, some embodiments display the transformed layout.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
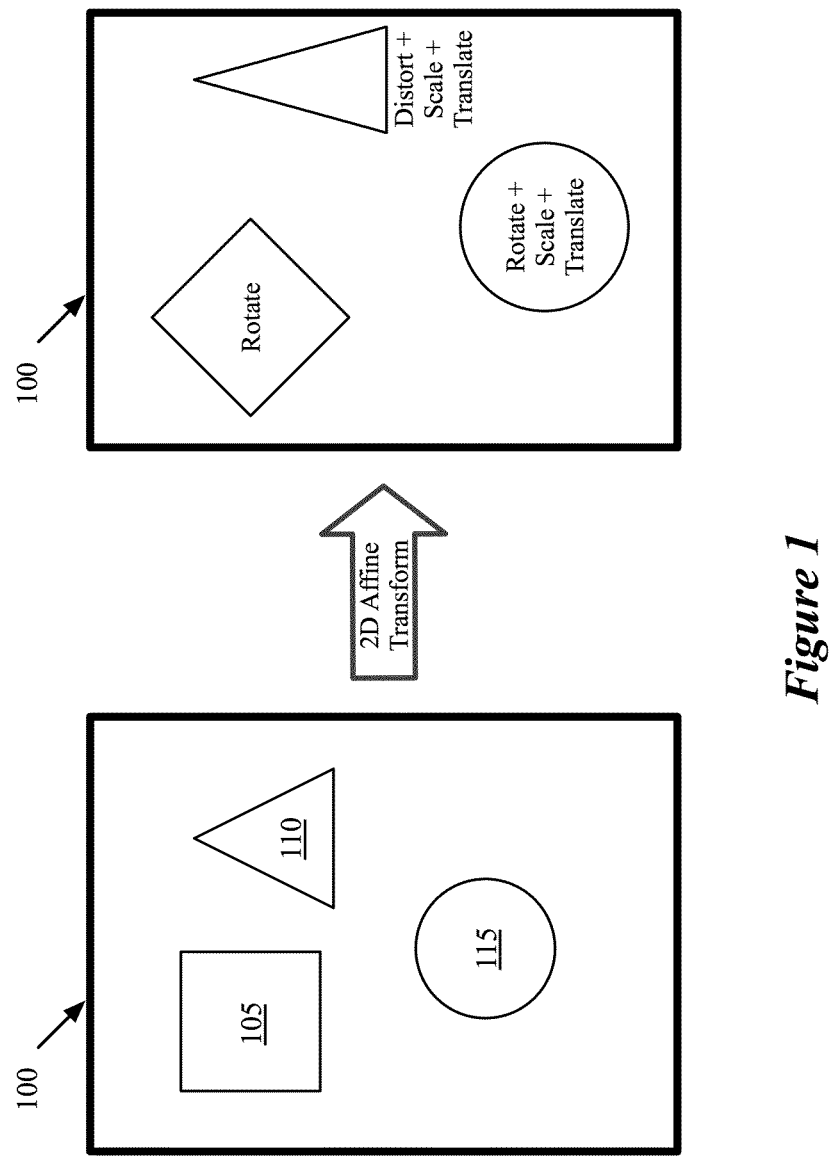
FIG. 1 illustrates an example of a layout to which a 2D affine transform is applied.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a novel structure for grouping multiple graphic objects (e.g., shapes, images, paths, surfaces, glyphs, etc.) into a single reusable data structure, or object, in which the different graphic objects may be affected differently by a single transform. Some embodiments also provide a method for applying the transform to such a grouped set of graphic objects that are part of a graphical layout in order to display the graphical layout in a transformed state. The method decomposes the transform into a set of primitive transforms and applies the primitive transforms in a particular order to the graphic objects according to settings of the graphic objects.

In some embodiments, the transform is a matrix operation that belongs to a particular class of transforms. For example, the transform could belong to the class of 2D affine transforms, which are transforms in two dimensions that preserve collinearity and distance ratios along a line. Additional classes of transforms include higher dimension affine transforms as well as various types of non-affine transforms in two or more dimensions.

A set of primitive transforms for a particular transform class is a canonical composition of matrix operations for the matrix representation of a generic transform of the particular transform class. That is, the set of primitive transforms for a particular transform class, when applied to a point in space (e.g., an (x, y) coordinate in two dimensions) in a particular order, can be shown to have the same result as applying the generic transform. Some transform classes may have multiple possible sets of primitive transforms, therefore the method of some embodiments defines a particular set of such primitive transforms for a particular transform class in advance, in order to define graphic object parameters in terms of the particular set of primitive transforms.

As mentioned, the composition of primitive transforms may require the set of primitive transforms to be applied in a particular order. For instance, if the transforms do not commute, then the composition may give different results if the primitive transforms are applied in a different order.

One example of a set of primitive transforms is a set of five transforms for the class of 2D affine transforms. Any transform in this class, as applied to a graphic object, may be decomposed into a composition of (i) reflection about an axis through the graphic object's center at a first particular angle, (ii) rotation about the graphic object's center at a second particular angle, (iii) distortion by stretching by a first factor along an axis through the graphic object's center at a third particular angle and squeezing by a second factor along an axis through the graphic object's center perpendicular to the third particular angle, (iv) scaling about the graphic object's center by a third factor, and (v) translating the object by a particular vector. Some embodiments apply these primitive transforms in the particular order given above (i.e., with reflection first and translation last).

FIG. 1 illustrates an example of a layout 100 to which a 2D affine transform is applied. The layout 100 includes a square 105, a triangle 110, and a circle 115, which are all stored as a single reusable graphic object (sometimes called an adaptive graphic object or adaptive drawing object herein). When applying a transform to a graphic object in the adaptive drawing object, some embodiments initially decompose the transform into its primitive factors as defined for the transform class to which the transform belongs. For instance, in the example of 2D affine transforms, the method of some embodiments identifies the reflection, rotation, distortion, scaling, and translation factors of the given transform.

The method then determines which of the primitive transforms affect the graphic object. In some embodiments, each graphic object is pre-defined with a set of participation states that indicate which transforms affect the graphic object. For instance, many user interface items should not scale when a user zooms in on a layout and should not translate when a user moves a layout, while other items participate in one or both of these transforms. Some embodiments define the participation states for a graphic object as an array of binary values (e.g., an array of five values for the 2D affine transform primitives discussed above).

The method applies to the graphic object only the transforms in which the object participates. As shown in FIG. 1, the only primitive transform applied to the square 105 is the rotation transform, the primitive transforms applied to the triangle 110 are the distortion, scaling, and translation transforms, and the primitive transforms applied to the circle 115 are the rotation, scaling, and translation transforms. The result is that different 2D affine transforms are applied to each of the three objects in layout 100 according to the defined properties of those objects.

Application of the transform may involve generating a new transform from the primitive factors for the given transform in which the object participates. For instance, if the object only participates in the translation and scaling primitives, then the method will generate a new transform that is a composition of these two primitives and apply this new transform to the graphic object. To generate the transform for the circle 115, for example, the method of some embodiments decomposes the 2D affine transform and then calculates a new transform using only the rotation, scaling, and translation primitives from the decomposition. This new transform is applied to the circle 115 (and any other graphic objects in the layout with the same set of participation states).

As mentioned, the reusable group of graphic objects may be stored as a single adaptive drawing object that defines the relationships between the individual graphic objects through the use of such transforms and sets of participation states. The adaptive drawing object of some embodiments stores the group of graphic objects as well as operations to perform on the graphic objects in order to define these relationships. In some embodiments, these operations may include grouping operations, transforms to a graphic object or a grouped set of graphic objects, and modifications to the participation states of one or more of the graphic objects. The grouping operations allow for efficiencies to be gained by not having to store the same transform or participation state change multiple times for the same adaptive drawing object. The end result of such a set of operations will be a transform for each graphic object as well as a set of output participation states for one or more classes of transform.

In some embodiments, the transform is received as a result of user interaction with a device on which the graphical layout is displayed. A user might interact with one of the graphic objects in the layout (e.g., via a touchscreen, cursor controller, etc.) or with the device generally in order to initiate the application of the transform. After applying the transform to the various graphic objects in the layout according to the participation states of those objects, some embodiments display the transformed layout.

Several more detailed embodiments of the invention are described below. Section I describes in further detail how to define primitive transforms for a particular transform class, including an example of a set of primitive transforms for the class of 2D affine transforms. Section II then describes the structure of adaptive drawing objects. Section III describes the process of transforming a set of graphic objects that make up an adaptive drawing object, while Section IV provides examples of specific layouts that include such adaptive objects. Section V describes the software architecture of a module of some embodiments for transforming graphic objects. Finally, Section VI describes an electronic system with which some embodiments of the invention are implemented.

I. Defining Primitive Transforms for a Transform Class

In order for a particular transform to be decomposed into its primitive transforms, primitive transforms must be defined for the transform class to which the particular transform belongs. For some transform classes, numerous different decompositions are possible, and thus it is left to a software designer to choose one. Once a set of primitive transforms are chosen, the primitive transforms are defined in terms of the variables of the generic transform.

Figure 2:
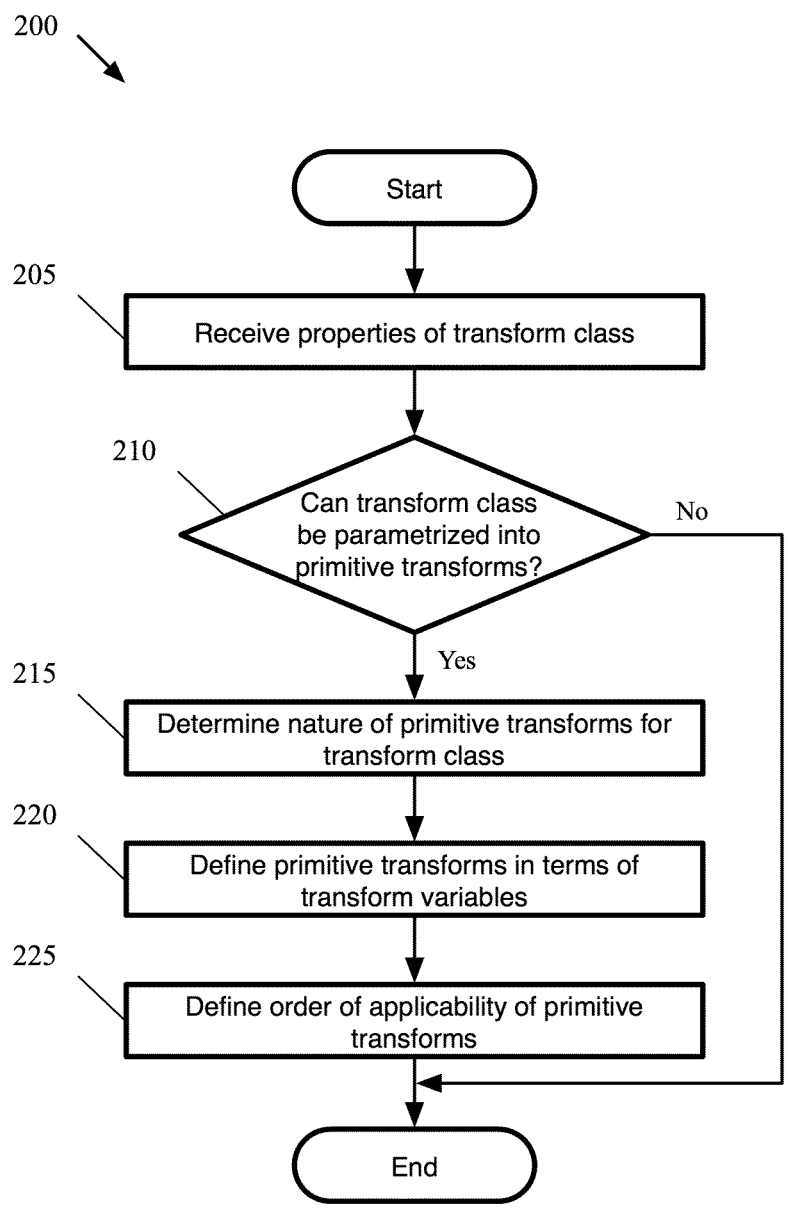
FIG. 2 conceptually illustrates a process of some embodiments for defining a decomposition of a generic transform for a particular transform class into a set of primitive transforms.

FIG. 2 conceptually illustrates a process 200 of some embodiments for defining a decomposition of a generic transform for a particular transform class into a set of primitive transforms. The process 200 is a process applicable to any transform class, but will be described here by reference to the particular class of 2D affine transforms. A 2D affine transform T, in some embodiments, is represented by the following matrix:

$$T\begin{pmatrix} x \\ y \end{pmatrix} = \begin{pmatrix} a & b \\ c & d \end{pmatrix}\begin{pmatrix} x \\ y \end{pmatrix} + \begin{pmatrix} e \\ f \end{pmatrix} \qquad (1)$$

A two dimensional affine transform is a transform that (i) preserves collinearity and (ii) preserves distance ratios along a line. That is, if three points are on a line before the transform, those three points will remain on a line after the transform. Furthermore, the ratios of the distances between the three points will remain the same after the transform as before the transform. 2D affine transforms are useful for transforms in a two-dimensional graphical user interface as most transforms of UI or layout objects fall into this class of transforms. For example, zooming, panning, and rotating are all very common user interface interactions that fall into the class of affine transforms.

As shown in FIG. 2, the process 200 begins by receiving (at 205) properties of a transform class. The process 200 may be performed by a software application designed to generate primitive transforms for a transform class in some embodiments, or may be performed by a mathematician, computer programmer, etc. The properties of a transform class may be received in some embodiments as a generic matrix transformation, such as that shown above in Equation (1). The properties may also be a set of statements about the transform class (e.g., that collinearity and distance ratios along a line are preserved).

Next, the process determines (at 210) whether the transform class can be parameterized into a set of primitive transforms. While the details given below illustrate that the transform class of 2D affine transforms represented by Equation (1) can be parameterized into a set of primitive transforms, such a parameterization is also possible for other classes of transforms (e.g., 3D or higher dimension affine transforms, non-affine transforms, etc.). In general, a larger number of variables in the transform (e.g., due to a higher number of dimensions) will result in a larger set of primitive transforms.

The process 200 then determines (at 215) the nature of the primitive transforms for the transform class. That is, the process determines what type of transforms should be included in the set of primitive transforms. In some embodiments, various different sets of primitive transforms may be chosen for a transform class. While applying each different set of primitive transforms for a particular transform will result in the particular transform being performed, not all sets of primitive transforms are equally useful when some of the primitive transforms are turned off for a particular object. In addition, in some embodiments the primitive transforms may be dependent on a property of the object being transformed (e.g., a location of the center of the object). This property may be defined for each object in some cases.

The following five transforms to apply to an object are one example of a set of primitive transforms for transforms in the class of 2D affine transforms, represented by Equation (1) above.

1. $T_1$: Reflect about an axis through the object center at an angle $\psi$ if the determinant is negative (ad-bc<0).
2. $T_2$: Rotate by an angle $\theta$ about the object center.
3. $T_3$: Distort by applying an area-preserving non-uniform scale transform that is a combination of stretching by a factor $\alpha$ and squeezing by a corresponding factor $\beta$ along an axis at an angle $\phi$ through the object center.
4. $T_4$: Scale the object uniformly about the object center by a factor $\lambda$.
5. $T_5$: Translate by a vector $(\mu, \nu)$.

Decomposing the generic 2D affine transform into these primitive transforms allows for layout objects (e.g., user interface items or other shapes, lines, etc.) to be programmed individually to either participate or not participate in each of the different primitive transforms $T_1$-$T_5$. The following FIGS. 3-7 illustrate examples of each of these transforms. The application of generic 2D affine transforms to layouts using these primitive transforms will be described further in Section II below.

Figure 3:
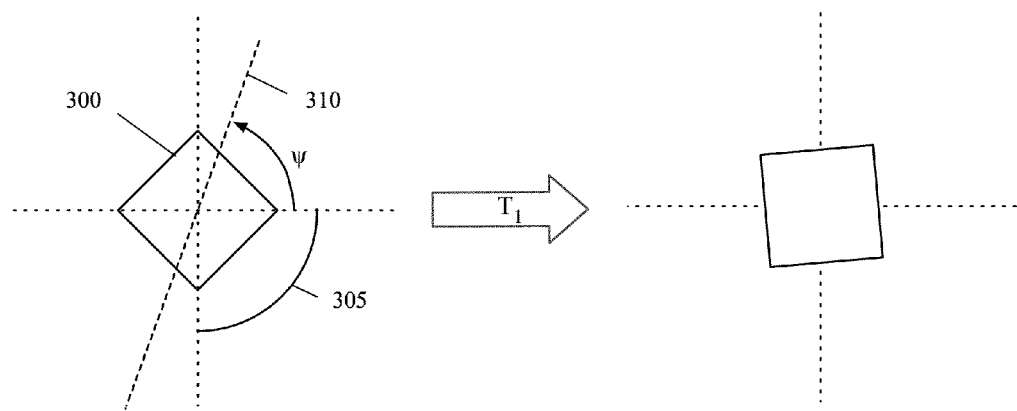
FIG. 3 illustrates the application of the primitive transform $T_1$ (reflection) to a square.

FIG. 3 illustrates the application of the primitive transform $T_1$ (reflection) to a square 300. In the following examples, the origin of the coordinate system 305 is shown at the center of the square for simplicity. In many cases, the center of an object affected by a transform will not be at the origin of the coordinate system in which the transformation is performed. In these cases, as will be shown in the equations below, many of the primitive transforms involve translating the object such that its center the origin, performing the transformation (e.g., rotation, scale, distort, reflect), then performing the opposite translation to move the center of the object back to its original location.

In FIG. 3, the square 300 is reflected about an axis 310 that runs through the center of square 300 at an angle $\psi$ relative to the coordinate system 305. As a result, the square is now at a different orientation. Because of the symmetric nature of the square, the result could also be obtained from a rotation of the square. However, for many objects, that do not possess rotational symmetry, a reflection will have effects not obtainable through a rotation.

Figure 4:
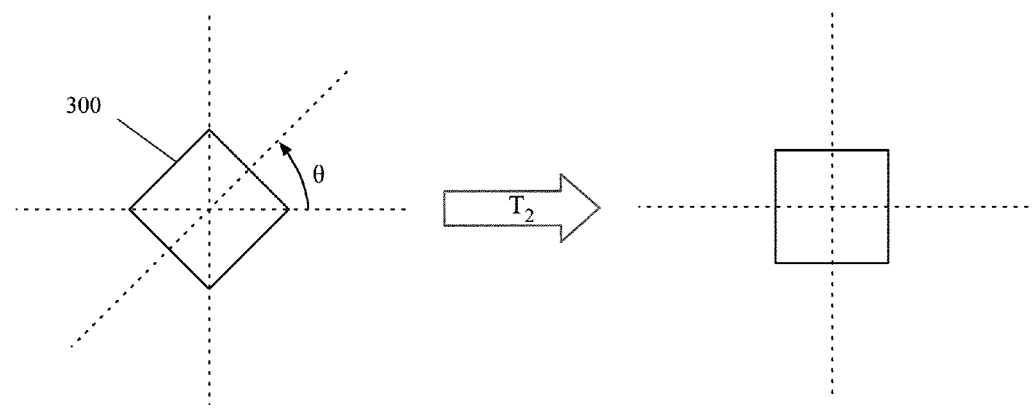
FIG. 4 illustrates the application of the primitive transform $T_2$ (rotation) to the square.
Figure 5:
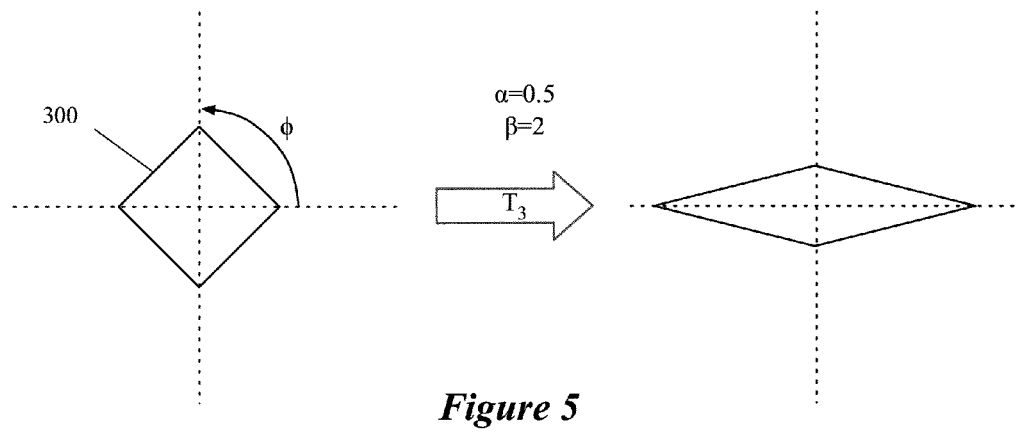
FIG. 5 illustrates the application of the primitive transform $T_3$ (distortion) to the square.

FIG. 4 illustrates the application of the primitive transform $T_2$ (rotation) to the square 300. In this case, the rotation transform rotates the square 300 by an angle $\theta$, approximately 45°. FIG. 5 illustrates the application of the primitive transform $T_3$ (distortion) to the square 300. In this case, the axis about which the square is distorted is the y-axis (i.e., the axis is at an angle $\phi$=90°. The distortion parameters, as shown, are $\alpha$=0.5 (distortion along the axis defined by angle $\phi$) and $\beta$=0.5 (distortion perpendicular to the axis defined by angle $\phi$).

Figure 6:
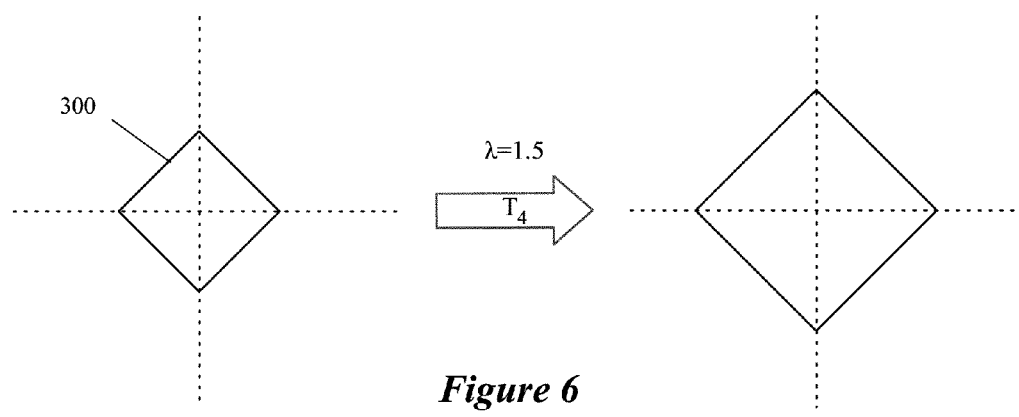
FIG. 6 illustrates the application of the primitive transform $T_4$ (scaling) to the square 300.
Figure 7:
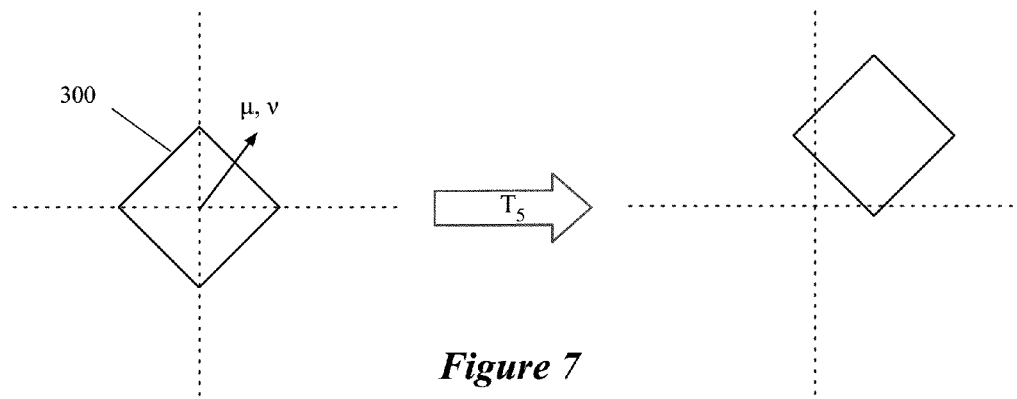
FIG. 7 illustrates the application of the primitive transform $T_5$ (translation) to the square.

FIG. 6 illustrates the application of the primitive transform $T_4$ (scaling) to the square 300. In this case the transform scales the square by a factor of $\lambda$=1.5. Like the previous three transforms, this primitive transform requires that the center of the object being scaled be located at the origin of the coordinate system. Finally, FIG. 7 illustrates the application of the primitive transform $T_5$ (translation) to the square 300. This transform translates the square by a vector $(\mu, \nu)$. For this transform, the center of the object being transformed does not need to be moved to the origin first, as the center does not play a role in the definition of the transform.

Returning to FIG. 2, the process 200 next defines (at 220) the primitive transforms in terms of the transform variables. That is, based on the variables of the generic transform (e.g., the variables a, b, c, d, e, and f shown in Equation (1) above), the process defines the different primitive transforms. The following illustrates the transforms $T_1$-$T_5$ described above as the primitive transforms for the generic 2D affine transforms. For any 2D affine transform T:

$$T = T_5 \circ T_4 \circ T_3 \circ T_2 \circ T_1, \text{ where} \qquad (2)$$

$$T_1 = S(x_C, y_C) \circ R(\psi) \circ D(1, \sigma) \circ R(-\psi) \circ S(-x_C, -y_C); \qquad (3)$$

$$T_2 = S(x_c, y_c) \circ R(\theta) \circ S(-x_C, -y_C); \qquad (4)$$

$$T_3 = S(x_C, y_C) \circ R(\phi) \circ D(\alpha, \beta) \circ R(-\phi) \circ S(-x_C, -y_C); \qquad (5)$$

$$T_4 = S(x_C, y_C) \circ D(\lambda, \lambda) \circ S(-x_c, -y_c); \text{ and} \qquad (6)$$

$$T_5 = S(\mu, \nu). \qquad (7)$$

The parameterized transforms S, R, and D are matrix operations having the following definitions:

$$S(\mu, \nu)\begin{pmatrix} x \\ y \end{pmatrix} = \begin{pmatrix} x \\ y \end{pmatrix} + \begin{pmatrix} \mu \\ \nu \end{pmatrix}; \qquad (8)$$

-continued $$R(\theta)\begin{pmatrix} x \\ y \end{pmatrix} = \begin{pmatrix} \cos\theta & -\sin\theta \\ \sin\theta & \cos\theta \end{pmatrix}\begin{pmatrix} x \\ y \end{pmatrix}; \text{ and} \quad (9)$$

$$D(\alpha, \beta)\begin{pmatrix} x \\ y \end{pmatrix} = \begin{pmatrix} \alpha & 0 \\ 0 & \beta \end{pmatrix}\begin{pmatrix} x \\ y \end{pmatrix}.$$

The parameters of the primitive transforms are derived from T, shown in Equation (1), as follows:

$$\sigma = \begin{cases} 1 & \text{if } ad - bc \geq 0 \\ -1 & \text{if } ad - bc < 0; \end{cases} \quad (10)$$

$$\psi = \begin{cases} 0 & \text{if } b+c=0 \text{ and } a-d \geq 0 \\ \dfrac{\pi}{2} & \text{if } b+c=0 \text{ and } a-d < 0 \\ \dfrac{1}{2}\cot^{-1}\dfrac{a-d}{b+c} & \text{if } b+c > 0 \\ \dfrac{1}{2}\cot^{-1}\dfrac{a-d}{b+c} + \dfrac{\pi}{2} & \text{if } b+c < 0 \end{cases} \quad (11)$$

$$= \text{half the angle made by the vector } \begin{pmatrix} a-d \\ b+c \end{pmatrix};$$

$\phi-\psi$=half the angle made by the vector $$\begin{pmatrix} a+d \\ b-c \end{pmatrix},$$

such that:

$$\phi = \begin{cases} \psi & \text{if } c-b=0 \text{ and } a+d \geq 0 \\ \psi + \dfrac{\pi}{2} & \text{if } c-b=0 \text{ and } a+d < 0 \\ \psi + \dfrac{1}{2}\cot^{-1}\dfrac{a+d}{c-b} & \text{if } c-b > 0 \\ \psi + \dfrac{1}{2}\cot^{-1}\dfrac{a+d}{b-c} + \dfrac{\pi}{2} & \text{if } c-b < 0; \end{cases} \quad (12)$$

$$\theta = (1+\sigma)(\phi - \psi) \quad (13)$$

$$= \begin{cases} 0 & \text{if } ad-bc < 0 \text{ or } ad-bc \geq 0, \\ & c-b=0 \text{ and } a+d \geq 0 \\ \pi & \text{if } ad-bc \geq 0, \\ & c-b=0 \text{ and } a+d < 0 \\ \cot^{-1}\dfrac{a+b}{c-d} & \text{if } ad-bc \geq 0 \text{ and } c-b > 0 \\ \cot^{-1}\dfrac{a+b}{c-d} + \pi & \text{if } ad-bc \geq 0 \text{ and } c-b < 0; \end{cases}$$

$$\lambda = \begin{cases} 1 & \text{if } ad-bc = 0 \\ \sqrt{|ad-bc|} & \text{if } ad-bc \neq 0; \end{cases} \quad (14)$$

$$\alpha = \frac{\sqrt{(a+d)^2 + (b-c)^2} + \sqrt{(a-d)^2 + (b+c)^2}}{2\lambda}; \quad (15)$$

-continued $$\beta = \begin{cases} 0 & \text{if } ad-bc = 0 \\ 1/\alpha & \text{if } ad-bc \neq 0; \end{cases} \quad (16)$$

$$\mu = (a-1)x_C + by_C + e; \quad (17)$$

$$\nu = cx_C + (d-1)y_C + f; \quad (18)$$

As these definitions illustrate, a given 2D affine transform will have either a reflection or a rotation, but not both. This is because a reflection about an axis at a particular angle (measured from the horizontal axis) can itself be decomposed into a reflection about the horizontal axis and a rotation by twice that particular angle. However, the decomposition treats a transform as involving a reflection when the determinant ad-bc is negative and a rotation when the determinant is positive.

The following proof illustrates that the above composition of factors does in fact produce T in all situations; i.e., that Equation (2) is correct. By combining pairs of translations and pairs of rotations (and noting that in both cases the parameters are additive under composition):

$$T_5 \circ T_4 \circ T_3 \circ T_2 \circ T_1 = S(x_C + \mu, y_C + \nu) \circ D(\lambda, \lambda) \circ R(\phi) \circ D(\alpha, \beta) \circ R(\psi+\theta-\phi) \circ D(1,\sigma) \circ R(-\psi) \circ S(-x_C, -y_C) \quad (19)$$

This can also be written as:

$$T_5 \circ T_4 \circ T_3 \circ T_2 \circ T_1 = S(ax_C + by_C + e, cx_C + dy_C + f) \circ M \circ S(-x_C, y_C), \text{ where} \quad (20)$$

$$M = D(\lambda,\lambda) \circ R(\phi) \circ (\alpha,\beta) \circ R(\psi+\theta-\phi) \circ D(1,\sigma) \circ R(-\psi). \quad (21)$$

Applying this transform to any vector (x, y) results in:

$$T_5 \circ T_4 \circ T_3 \circ T_2 \circ T_1 \begin{pmatrix} x \\ y \end{pmatrix} = M\begin{pmatrix} x - x_C \\ y - y_C \end{pmatrix} + \begin{pmatrix} ax_C + by_C + e \\ cx_C + dy_C + f \end{pmatrix}. \quad (22)$$

The matrix form of T can also be rewritten as:

$$T\begin{pmatrix} x \\ y \end{pmatrix} = \begin{pmatrix} a & b \\ c & d \end{pmatrix}\begin{pmatrix} x \\ y \end{pmatrix} + \begin{pmatrix} e \\ f \end{pmatrix} \quad (23)$$

$$= \begin{pmatrix} a & b \\ c & d \end{pmatrix}\begin{pmatrix} x - x_C \\ y - y_C \end{pmatrix} + \begin{pmatrix} ax_C + by_C + e \\ cx_C + dy_C + f \end{pmatrix}.$$

Thus, it is sufficient to prove that the matrix M that represents the linear transform M is equal to $$\begin{pmatrix} a & b \\ c & d \end{pmatrix}.$$

Accordingly, we can multiply the matrix factors of M:

$$M = \begin{pmatrix} \lambda & 0 \\ 0 & \lambda \end{pmatrix}\begin{pmatrix} \cos\phi & -\sin\phi \\ \sin\phi & \cos\phi \end{pmatrix}\begin{pmatrix} \alpha & 0 \\ 0 & \beta \end{pmatrix}\begin{pmatrix} \cos(\psi+\theta-\phi) & -\sin(\psi+\theta-\phi) \\ \sin(\psi+\theta-\phi) & \cos(\psi+\theta-\phi) \end{pmatrix}\begin{pmatrix} 1 & 0 \\ 0 & \sigma \end{pmatrix}\begin{pmatrix} \cos\psi & \sin\psi \\ -\sin\psi & \cos\psi \end{pmatrix} \quad (24)$$

$$= \lambda\begin{pmatrix} \alpha\cos\phi & -\beta\sin\phi \\ \alpha\sin\phi & \beta\cos\phi \end{pmatrix}$$

$$\begin{pmatrix} \cos(\psi+\theta-\phi)\cos\psi + \sigma\sin(\psi+\theta-\phi)\sin\psi & \cos(\psi+\theta-\phi)\sin\psi - \sigma\sin(\psi+\theta-\phi)\cos\psi \\ -\sigma\cos(\psi+\theta-\phi)\sin\psi + \sin(\psi+\theta-\phi)\cos\psi & \sigma\cos(\psi+\theta-\phi)\cos\psi + \sin(\psi+\theta-\phi)\sin\psi \end{pmatrix}$$

$$= \lambda \begin{pmatrix} \alpha\cos\phi & -\beta\sin\phi \\ \alpha\sin\phi & \beta\cos\phi \end{pmatrix} \begin{pmatrix} \cos((1-\sigma)\psi+\theta-\phi) & -\sigma\sin((1-\sigma)\psi+\theta-\phi) \\ \sin((1-\sigma)\psi+\theta-\phi) & \sigma\cos((1-\sigma)\psi+\theta-\phi) \end{pmatrix} \text{ since } \sigma = \pm 1$$

$$= \lambda \begin{pmatrix} \alpha\cos\phi & -\beta\sin\phi \\ \alpha\sin\phi & \beta\cos\phi \end{pmatrix} \begin{pmatrix} \cos(\sigma(\phi-2\psi)) & -\sigma\sin(\sigma(\phi-2\psi)) \\ \sin(\sigma(\phi-2\psi)) & \sigma\cos(\sigma(\phi-2\psi)) \end{pmatrix} \text{ since } \theta = (1+\sigma)(\phi-\psi)$$

$$= \lambda \begin{pmatrix} \alpha\cos\phi & -\beta\sin\phi \\ \alpha\sin\phi & \beta\cos\phi \end{pmatrix} \begin{pmatrix} \cos(\phi-2\psi) & -\sin(\phi-2\psi) \\ \sigma\sin(\phi-2\psi) & \sigma\cos(\phi-2\psi) \end{pmatrix}$$

$$= \lambda \begin{pmatrix} \alpha\cos\phi\cos(\phi-2\psi) - \sigma\beta\sin\phi\sin(\phi-2\psi) & -\alpha\cos\phi\sin(\phi-2\psi) - \sigma\beta\sin\phi\cos(\phi-2\psi) \\ \alpha\sin\phi\cos(\phi-2\psi) + \sigma\beta\cos\phi\sin(\phi-2\psi) & -\alpha\sin\phi\sin(\phi-2\psi) + \sigma\beta\cos\phi\cos(\phi-2\psi) \end{pmatrix}$$

The individual components of $$M = \begin{pmatrix} m_{11} & m_{12} \\ m_{21} & m_{22} \end{pmatrix}$$

therefore satisfy the following equations:

$$m_{11} + m_{22} = \lambda(\alpha + \sigma\beta)(\cos\phi\cos(\phi-2\psi) - \sin\phi\sin(\phi-2\psi)) \quad (25)$$
$$= \lambda(\alpha + \sigma\beta)\cos(2(\phi-\psi));$$

$$m_{11} - m_{22} = \lambda(\alpha - \sigma\beta)(\cos\phi\cos(\phi-2\psi) + \sin\phi\sin(\phi-2\psi)) \quad (26)$$
$$= \lambda(\alpha - \sigma\beta)\cos(2\psi);$$

$$m_{21} + m_{12} = \lambda(\alpha - \sigma\beta)(\sin\phi\cos(\phi-2\psi) - \cos\phi\sin(\phi-2\psi)) \quad (27)$$
$$= \lambda(\alpha - \sigma\beta)\sin(2\psi);$$

and $$m_{21} - m_{12} = \lambda(\alpha + \sigma\beta)(\sin\phi\cos(\phi-2\psi) + \cos\phi\sin(\phi-2\psi)) \quad (28)$$
$$= \lambda(\alpha + \sigma\beta)\sin(2(\phi-\psi)).$$

Using the formulas for $\lambda$, $\alpha$, $\sigma$, $\phi$, and $\psi$ (i.e., Equations (14), (15), (10), (12), and (11)) gives the following results:
If ad−bc≠0, then $\beta = 1/\alpha$ and therefore:

$$\lambda(\alpha + \sigma\beta) = \frac{\sqrt{(a+d)^2 + (b-c)^2} + \sqrt{(a-d)^2 + (b+c)^2}}{2} + \quad (29)$$
$$\frac{2(ad-bc)}{\sqrt{(a+d)^2 + (b-c)^2} + \sqrt{(a-d)^2 + (b+c)^2}}$$
$$= \frac{\sqrt{(a+d)^2 + (b-c)^2} + \sqrt{(a-d)^2 + (b+c)^2}}{2} + \frac{\sqrt{(a+d)^2 + (b-c)^2} - \sqrt{(a-d)^2 + (b+c)^2}}{2}$$
$$= \sqrt{(a+d)^2 + (b-c)^2}$$

and $$\lambda(\alpha - \sigma\beta) = \frac{\sqrt{(a+d)^2 + (b-c)^2} + \sqrt{(a-d)^2 + (b+c)^2}}{2} - \quad (30)$$
$$\frac{2(ad-bc)}{\sqrt{(a+d)^2 + (b-c)^2} + \sqrt{(a-d)^2 + (b+c)^2}}$$
$$= \frac{\sqrt{(a+d)^2 + (b-c)^2} + \sqrt{(a-d)^2 + (b+c)^2}}{2} - \frac{\sqrt{(a+d)^2 + (b-c)^2} - \sqrt{(a-d)^2 + (b+c)^2}}{2}$$
$$= \sqrt{(a-d)^2 + (b+c)^2}$$

If ad−bc=0, then $(a+d)^2 + (b-c)^2 = (a-d)^2 + (b+c)^2$, which yields the same results:

$$\lambda(\alpha + \sigma\beta) = \alpha \quad (31)$$
$$= \frac{1}{2}\left(\sqrt{(a+d)^2 + (b-c)^2} + \sqrt{(a-d)^2 + (b+c)^2}\right)$$
$$= \sqrt{(a+d)^2 + (b-c)^2}$$

and $$\lambda(\alpha - \sigma\beta) = \alpha \quad (32)$$
$$= \frac{1}{2}\left(\sqrt{(a+d)^2 + (b-c)^2} + \sqrt{(a-d)^2 + (b+c)^2}\right)$$
$$= \sqrt{(a-d)^2 + (b+c)^2}.$$

In addition, $$\cos(2(\phi-\psi)) = \begin{cases} 1 & \text{if } a+d=0 \text{ and } b-c=0 \\ \frac{a+d}{\sqrt{(a+d)^2 + (b-c)^2}} & \text{otherwise;} \end{cases} \quad (33)$$

$$\sin(2(\phi-\psi)) = \begin{cases} 0 & \text{if } a+d=0 \text{ and } b-c=0 \\ \frac{c-b}{\sqrt{(a+d)^2 + (b-c)^2}} & \text{otherwise;} \end{cases} \quad (34)$$

$$\cos(2(\psi)) = \begin{cases} 1 & \text{if } a-d=0 \text{ and } b+c=0 \\ \frac{a-d}{\sqrt{(a-d)^2 + (b-c)^2}} & \text{otherwise;} \end{cases} \quad (35)$$

$$\sin(2\psi) = \begin{cases} 0 & \text{if } a-d=0 \text{ and } b+c=0 \\ \frac{b+c}{\sqrt{(a-d)^2 + (b-c)^2}} & \text{otherwise.} \end{cases} \quad (36)$$

Thus, substituting Equations (29)-(36) into Equations (25)-(28), gives:

$$m_{11} + m_{22} = a+d; \quad (37)$$

$$m_{11} - m_{22} = a-d; \quad (38)$$

$$m_{21} + m_{12} = c+b; \text{ and} \quad (39)$$

$$m_{21} - M_{12} = c-b. \quad (40)$$

Adding equations (37) and (38) gives $m_{11} = a$, while subtracting these equations gives $m_{22} = d$. Similarly, adding equations

(39) and (40) gives $m_{21}=c$, while subtracting these equations gives $m_{12}=b$. Therefore, as required:

$$M = \begin{pmatrix} a & b \\ c & d \end{pmatrix}. \quad (41)$$

Returning to FIG. 2, the process 200 next defines (at 225) an order of applicability for the primitive transforms now that the primitive transforms are defined. As the primitive transforms generally do not commute (i.e., it can be shown that the factorization for a 2D affine transform will not commute), an order must be defined for the primitive transforms. In some cases, this order is dependent on the transform definitions. That is, the primitive transforms will have to be defined differently if applied in a different order, as the primitive transforms must equate to the generic transform when applied in the particular order. In the example case for 2D affine transforms, the primitive transforms are ordered with reflection or rotation (whichever of the two applies, if either) applied first, then distortion, then scaling, and finally translation.

In some embodiments, the process defines the order so that when a particular transform is turned off for an object, the resulting transform on the object gives an expected result. When all primitive transforms are applied to an object, the resulting transform will be the applied transform, as this is a requirement for the decomposition. However, when an object does not rotate, for example, the application of the other transforms should result in the effect expected for the transform without rotation applied.

While the example used in the above section shows decomposing a generic 2D affine transform into primitive transforms, similar decompositions may be chosen for higher-dimensional affine transforms (e.g., a set of transforms with additional rotation angles and distortion parameters to account for the additional dimensions. Similarly, decompositions may be determined for non-affine transforms, both in two dimensions or in higher dimensions. Some examples of such transforms include three-dimensional perspective, orthographic, or other projection transforms.

II. Defining Adaptive Objects

The above section described the definition of a set of primitive transforms for a particular type of transform. With these primitive transforms defined (for one or more classes of transforms), adaptive drawings may then be defined (e.g., by a software developer) as sets of graphic objects to which a stack of transforms are applied.

An adaptive drawing, in some embodiments, is a set of graphic objects (which may themselves be adaptive drawings) and a set of operations to apply to the graphic objects. These operations may include grouping operations to group two or more of the graphic objects together, modifications to the participation state of an object or group of objects, and transform operations that apply a transform to an object or group of objects according to the participation states of the objects.

After application of the operations, each primitive graphic object has a set of participation states for each class of transforms for which a set of primitive transforms have been defined. When a software agent applies further transforms to the adaptive drawing, the transform can be applied separately to each primitive object using the participation states for the primitive object, as determined through the set of operations that define the adaptive drawing.

Figure 8:
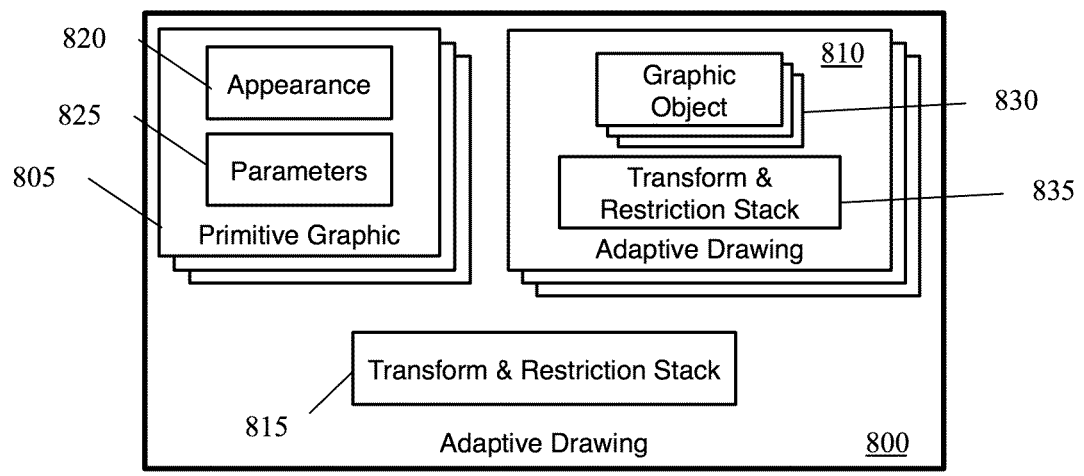
FIG. 8 conceptually illustrates the structure of an adaptive drawing of some embodiments.

FIG. 8 conceptually illustrates the structure of an adaptive drawing 800 of some embodiments. The adaptive drawing is a package (e.g., a software object) that includes a set of primitive graphics 805, a set of adaptive drawings 810, and a transform and restriction stack 815. As shown, the adaptive drawing 800 may include both primitive graphic objects as well as adaptive drawings that themselves include sets of graphic objects.

In some embodiments, each primitive graphic object 805 includes a definition of the appearance 820 of the graphic object. Depending on the type of graphic object, the appearance data 820 may be formatted in different ways. For instance, if the graphic object is a raster image, then the appearance is defined by a set of pixels having various pixel values. If the graphic object is a vector graphic, then one or more paths, shapes, etc. define the appearance.

The primitive graphic objects 805 may also include one or more parameters 825. In some embodiments, the parameters include specific locations in the object having particular meaning. This may include the definition of a center for the object, which may be used in the application of certain primitive transforms (e.g., the composition described above in Section I). The definition of glyphs (e.g., collections of vector graphics paths that are used to define an alphanumeric character) will often include an anchor point. When no center is defined for an object, some embodiments use one algorithm or another to identify a center for the application of primitive transforms. For instance, different embodiments may integrate along a path to determine the center of mass of the path, may take an average of the coordinates of points of the object, etc.

The adaptive drawings 810 which are among the objects of adaptive drawing 800 include graphic objects 830 (which may themselves be primitive graphic objects such as objects 805 or adaptive drawings such as 810) and a transform and restriction stack 835. The structure of the adaptive drawings 830, as shown, is similar to that of the parent drawing 800.

The transform and restriction stack 815 is a set of operations that defines the relationships between the various graphic objects 805 and 810. Essentially, each graphic object goes through a set of operations leading up to its display on a display device (e.g., computer monitor, tablet screen, smart phone screen, etc.). As mentioned, these operations may include grouping operations, changes to the participation state of an object or group of objects, and application of transforms to an object or group of objects.

Figure 9:
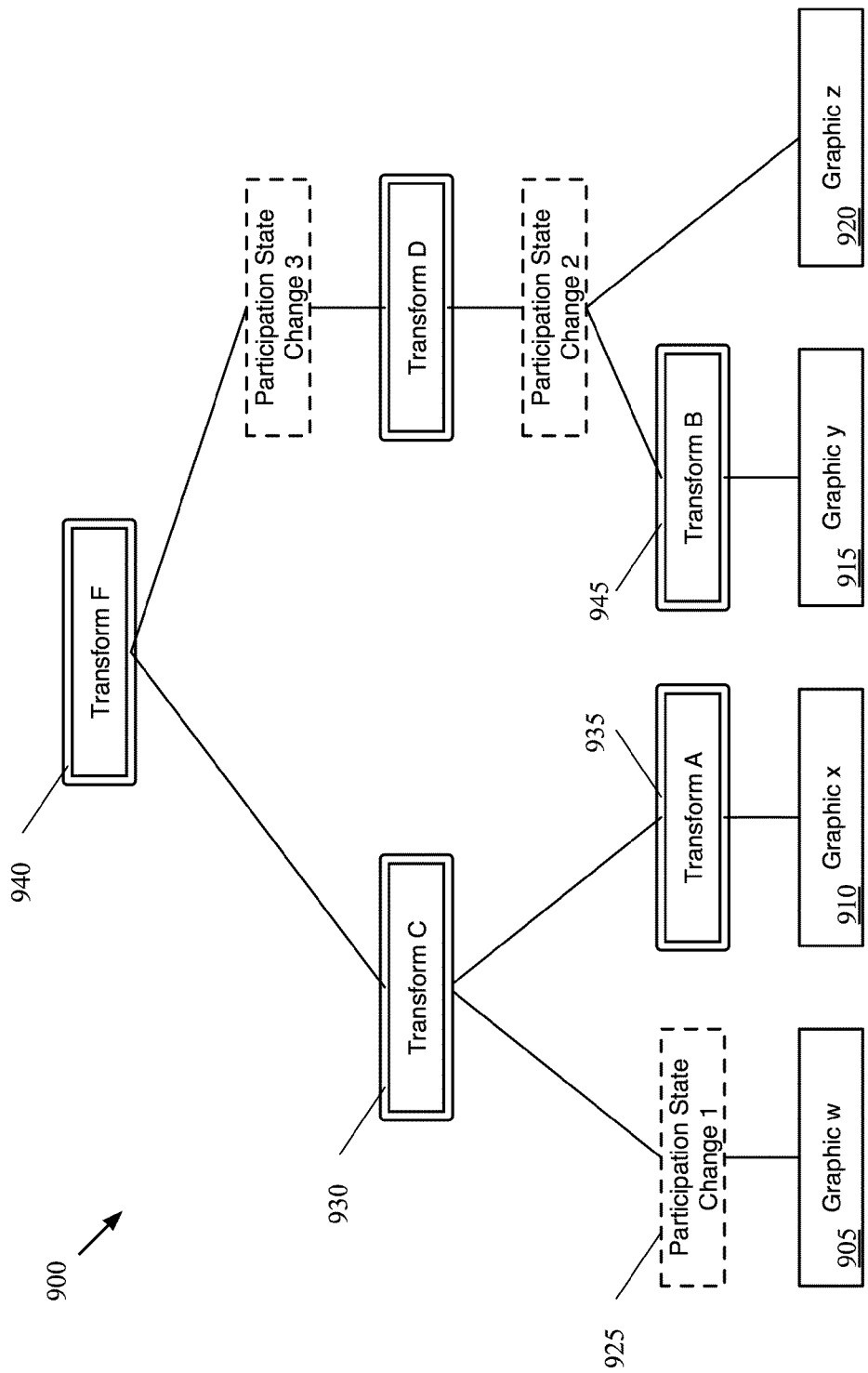
FIG. 9 conceptually illustrates a set of operations to apply to four graphic objects that make up an adaptive drawing.

FIG. 9 conceptually illustrates a set of operations to apply to four graphic objects 905-920 that make up an adaptive drawing. The graphic objects 905-920 may each have its own set of participation state changes, groupings, and transforms that are applied to it. In general, a graphic object will have a set of participation states (i.e., definitions as to which of a set of primitive transforms will affect the object and which primitive transforms the object is restricted from participating in) and one or more transforms are applied to the graphic object according to the participation states. After a transform is applied to an object, the object may be grouped with one or more other objects, the participation states of the object may be modified, or another transform may be applied.

The set of operations in FIG. 9 is illustrated as a tree structure 900. The set of operations to apply to a particular graphic object can be determined by following the tree structure. For instance, the graphic object w 905 first goes through a change to its participation states at operation 925. The change to an object's participation states may be coded as a modification to specific participation states (e.g., specifically turning on or off a single participation state without affecting other participation states) or as a new array of participation states. Using the example given above for 2D affine transforms, the change in participation states might specifically cause turn off the rotation primitive (without modifying the participation states for reflection, distortion, scaling, or translation), or be coded as an array of [1 0 1 1 1] that leaves the object with its rotation participation state off and all other participation states turned on.

Next, transform C is applied to the graphic object w 905 at operation 930. As one can see, this operation is also applied to graphic object x 910 (after the application of transform A at operation 935). In its application to graphic object w 905, the transform C is decomposed into its primitive transforms and only those primitive transforms that are turned on for object w 905 at operation 925 will affect object w 905. After the application of transform C at operation 930, the object w 905 (and object x 910) is grouped with the other two objects and transform F is applied to all of the objects at operation 940.

A software developer can package up the operations shown in tree structure 900 as an adaptive drawing object and serialize the object such that the adaptive drawing object can be reused by various software agents (e.g., as shown in FIG. 8). Some embodiments store the adaptive drawing object as a single file, data stream, or software resource that includes the information that defines each graphic object, as well as the transforms and state changes. In some embodiments, the adaptive drawing transform structure may be opaque to future software agents, in which case the set of transforms and participation state changes may be resolved for each graphic object to result in (i) a net transform to the graphic object (i.e., by multiplying all of the transforms applied to the object in the order that the transforms are applied) and (ii) a set of output participation states for the graphic object (the participation states for the graphic object at the end of the operations). Any future transforms applied to the adaptive drawing object by a software agent will use the output participation states for the graphic objects, unless the software agent also applies an operation to change the participation states (e.g., turning the rotation primitive on for all objects that make up the adaptive drawing object).

When packaging up the operations for an adaptive drawing, some embodiments will resolve all of the transforms for each object so that there is only a single transform to apply to the object and a set of output participation states for the object, rather than storing an entire tree structure such as shown in FIG. 9. In some embodiments, when the graphic object is a vector graphic, the resolved transform is applied to the graphic object beforehand and the stored graphic object reflects this transform. On the other hand, when the graphic object is a raster image, the graphic object is stored in its original state as part of the adaptive drawing object (e.g., as a .jpg, .png, etc.) and the resolved transform is also stored as part of the adaptive drawing object and applied to the image at runtime (as the act of transforming a raster image may be a lossy process).

On the other hand, in order to retain the efficiencies of shared transforms (e.g., the application of transform F to all four graphic objects 905-920) at operation 940 of the tree structure 900, some embodiments may store the entire tree structure of operations in the adaptive drawing object. In addition, with the entire set of operations stored as part of the object, some embodiments may provide an application programming interface (API), in which the structure of the object is transparent, thereby allowing the later software developer to traverse the tree structure of the object and modify the operations. For instance, if a developer wanted a first user interaction operation to cause a particular graphic object that is part of an adaptive drawing to rotate along with the rest of the adaptive drawing, but also wanted the particular graphic object not to rotate under a second user interaction, the developer could write one of the processes to traverse the tree structure and modify the rotation participation state of the particular graphic object without affecting the other objects in the adaptive drawing.

However, generally, the tree structure is designed to be unmodified by future developers, such that the adaptive drawing can be easily reused by different software applications. Breaking transforms into primitives and using participation states to restrict the application of the primitives enables more graphic objects to be packaged together as a single reusable object. For instance, a compass rose can be packaged along with a map object as a single object, with the participation states for translation and scaling turned off. When the map is translated and scaled, the compass rose is not affected; when the map is rotated, however, the compass rose rotates along with the map.

Figure 10:
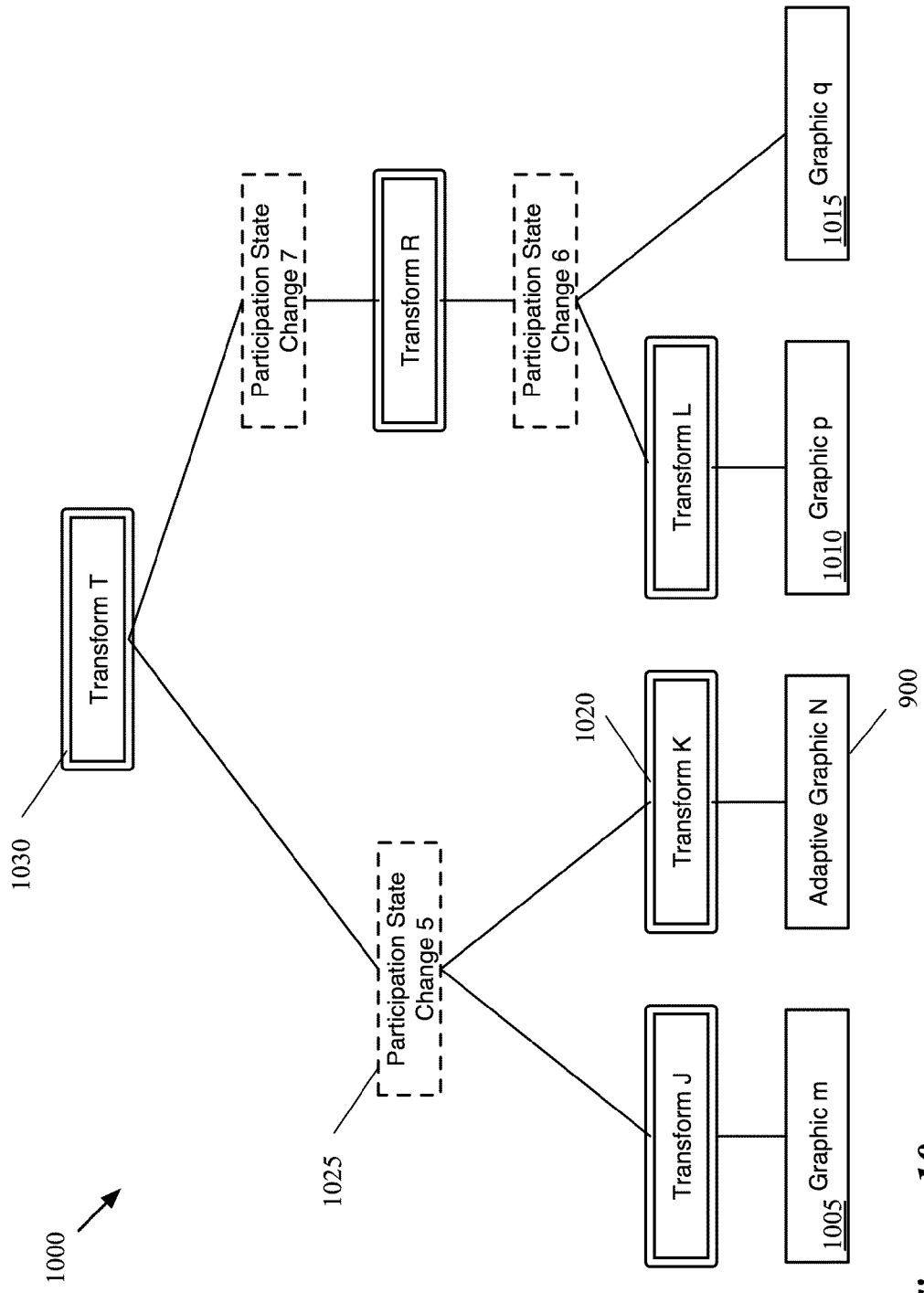
FIG. 10 conceptually illustrates a set of operations to apply to four graphic objects that make up an adaptive drawing, one of which is the adaptive drawing of FIG. 9.

In addition to use on its own as a single graphic object, in some embodiments the adaptive graphic object may be reused as a graphic object node in another graphic object package. FIG. 10 conceptually illustrates a set of operations to apply to four graphic objects that make up an adaptive drawing, one of which is the adaptive drawing 900 of FIG. 9. As described above for the adaptive drawing 900, each of the graphic objects 1005-1015 and 900 has a set of transforms applied according to the participation states of the graphic object. For primitive graphic objects 1005-1015, the illustrated transforms and participation state changes are applied in the same manner as described for the objects in FIG. 9.

For adaptive graphic object N 900, the transforms illustrated for each of its graphic objects 905-920 are initially applied to generate an output transform and set of participation states for each object. The applicable nodes of object tree 1000 are then applied to each of these objects 905-920. Transform K 1020 is applied, then participation state change 1025. The participation state change 1025 modifies all of the objects 905-920, in addition to the object 1005. Finally, the transform T 1030 is applied to all of the objects in the adaptive drawing, including all of the different objects of adaptive graphic 900.

Much like the use of the adaptive drawing 900 in adaptive drawing 1000, the developer of adaptive drawing 1000 can package up this object as a single graphic object (e.g., as a file, a data stream, or a software resource), which can then be re-used either on its own or as part of another adaptive object. This hierarchical nesting of adaptive graphic objects can be continued to any number of levels, in some embodiments. At each level, the author of a particular adaptive drawing package does not need to be aware of the operations (i.e., transforms and changes in participation states) embedded in any adaptive drawings used by the particular drawing package. Similarly, the author need not be aware of the future uses of the particular drawing package, but simply can use transforms and participation state restrictions to define its behavior in any such uses.

Figure 11:
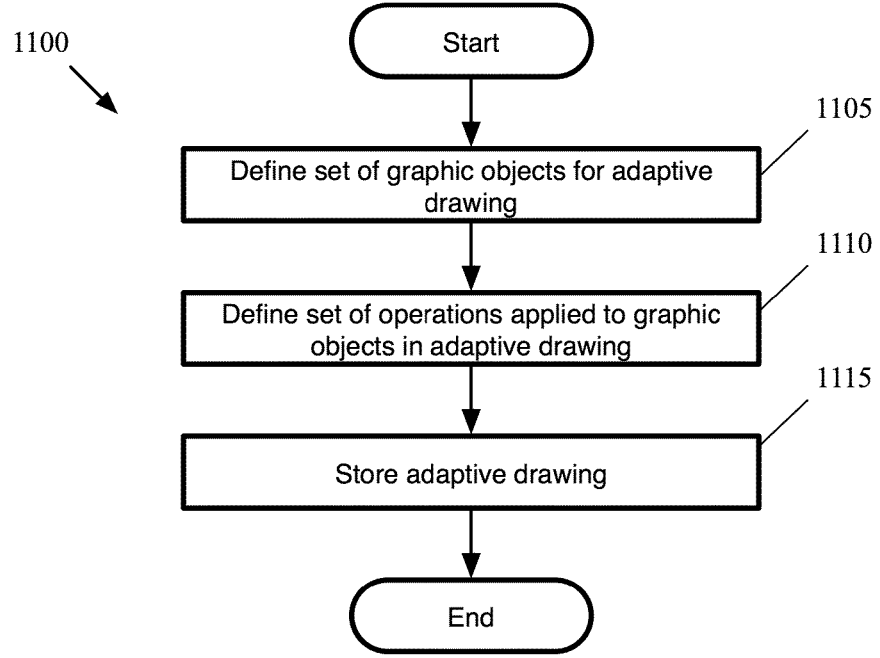
FIG. 11 conceptually illustrates a process of some embodiments for generating an adaptive drawing.

FIG. 11 conceptually illustrates a process 1100 of some embodiments for generating an adaptive drawing. The process 1100 begins by defining (at 1105) a set of graphic objects for the adaptive drawing. These may be predefined graphic objects or graphic objects that the developer defines specifically for use in the adaptive drawing. As mentioned above, the graphic objects can be vector graphics, images, or glyphs (which may be collections of vector graphics). Predefined graphic objects may include additional adaptive drawings already packaged and stored by a software developer (for instance, referring again to the map example, the compass rose might itself be an adaptive drawing made up of two or more graphic objects).

Next, the process 1100 defines (at 1110) a set of operations that are applied to the graphic objects in the adaptive drawing. These may be operations to transform one or more of the objects, change the participation states of the object, or group two or more of the objects together. The tree structure 900 conceptually illustrates one example of such a set of such operations, for an adaptive drawing with four graphic objects. The various operations serve to define a relationship between the different graphic objects 905-920 that defines how the objects appear relative to each other when displayed on an electronic display device.

With the adaptive drawing object defined, the process stores (at 1115) the drawing object. In some embodiments, the adaptive drawing is stored in a serialized format (i.e., a format that can be stored and later resurrected in the same or another computer environment). For instance, some embodiments store the adaptive drawing object as a file in eXtensible Markup Language (XML) format.

Some embodiments store the adaptive drawing in an in-memory representation (e.g., an API structure). For instance, the adaptive drawing might be stored as an object in a software library or framework (e.g., as part of an OS) with standard methods that may be performed on the object (e.g., standard transforms). The adaptive drawing object could then be passed between various software agents (e.g., applications) that are written independently, but all use the same object. Such software agents could use the object without a need to know the details of the various transforms and other operations applied within the adaptive drawing object. When an application wants to transform the object, the application can send a command through the API, which knows to apply all of the various restrictions encoded in the adaptive drawing object when applying the transform to the object.

Various methods on the adaptive drawing exist in some embodiments. These include public methods that are exposed through the API (i.e., the commands that an application could send through the API), such as a request to group objects and return a new grouped object, transform an object, request the participation states of objects within an adaptive object, and set the participation states of the objects. The methods may also include private methods (which a developer could make public) such as decomposing a transform, recomposing a transform according to participation states, setting the center of an object, etc.

Figure 12:
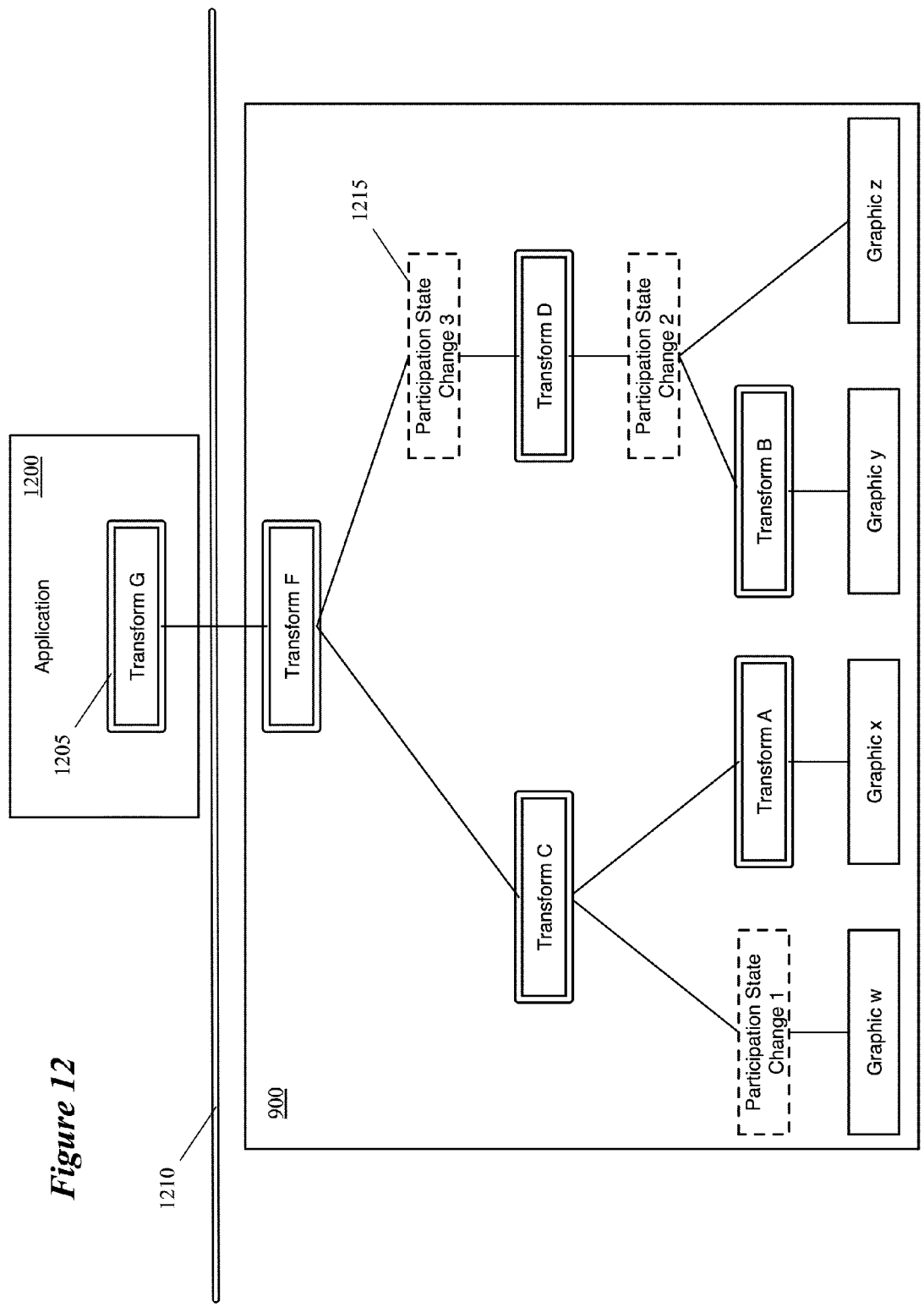
FIG. 12 illustrates an application applying a transform to the adaptive drawing object of FIG. 9.

FIG. 12 illustrates an application 1200 applying a transform G to the adaptive drawing object 900. The operation 1205 is sent as a command through the API 1210 to transform adaptive drawing object 900. The operation 1205 thus affects each of the graphic objects 905-920 separately according to the participation states of each of these objects. Thus, before graphic object w 905 is output to an electronic display device, the object has its participation state changed (at operation 910), then is transformed by the composition of transforms C, F, and G. While transform G affects graphic object w 905 according to the participation states introduced at operation 925, the graphic objects y 915 and z 920 are affected according to the participation states designated at operation 1215.

Figure 13:
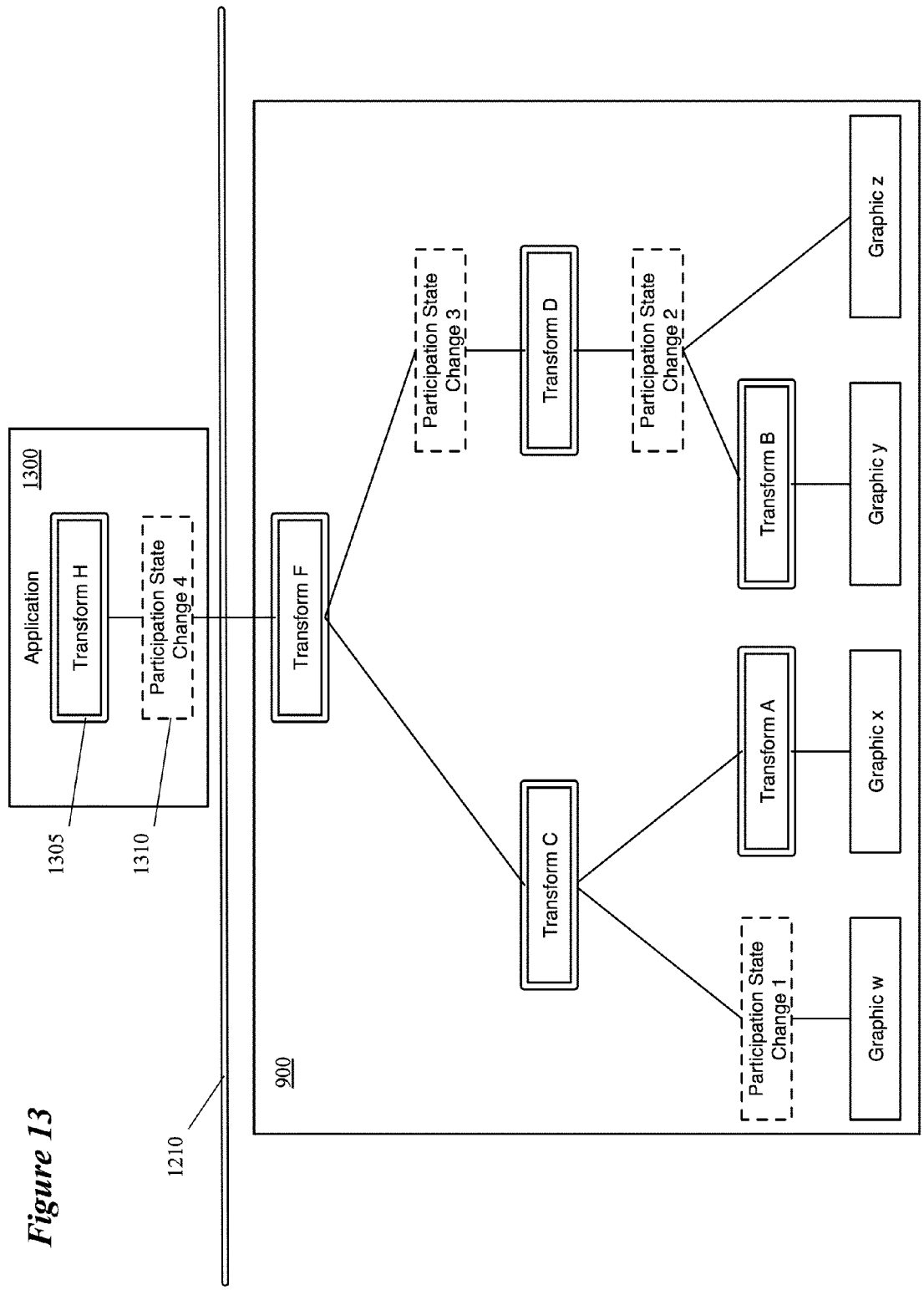
FIG. 13 illustrates an application that applies a transform to the adaptive drawing object of FIG. 9, but modifies the participation states of the objects before doing so.

FIG. 13 illustrates an application 1300 that applies a transform H to the adaptive drawing object 900, but modifies the participation states of the objects 905-920 before doing so. The operations 1305 and 1310 are sent as a command through the API 1210 to transform the drawing object 900. In some embodiments, the operation 1305 ensures that the graphic objects each have the same participation states when transform H is applied to them (if the operation 1305 modifies all of the participation states). When the operation 1305 only modifies a particular subset of the participation states, the different objects may each be transformed differently.

III. Transforming Adaptive Objects

The above section described how an adaptive drawing object is defined and stored for later use. Each graphic object of the adaptive drawing object having its own set of output participation states, transforms applied to the adaptive drawing object may affect the different individual graphic objects differently. When an application that uses the adaptive drawing object (e.g., an application running on a desktop using a menu object, a web mashup using a map object, etc.) modifies the object (e.g., as part of the display process of the application, in response to user input to the application, etc.), the application sends a command to the object (e.g., through an API). The command may include one or more transforms as well as changes to the participation states of the objects in the object. As illustrated in FIGS. 12 and 13, these transforms are applied to the object after the application of the other transforms that are defined as part of the adaptive drawing object.

Figure 14:
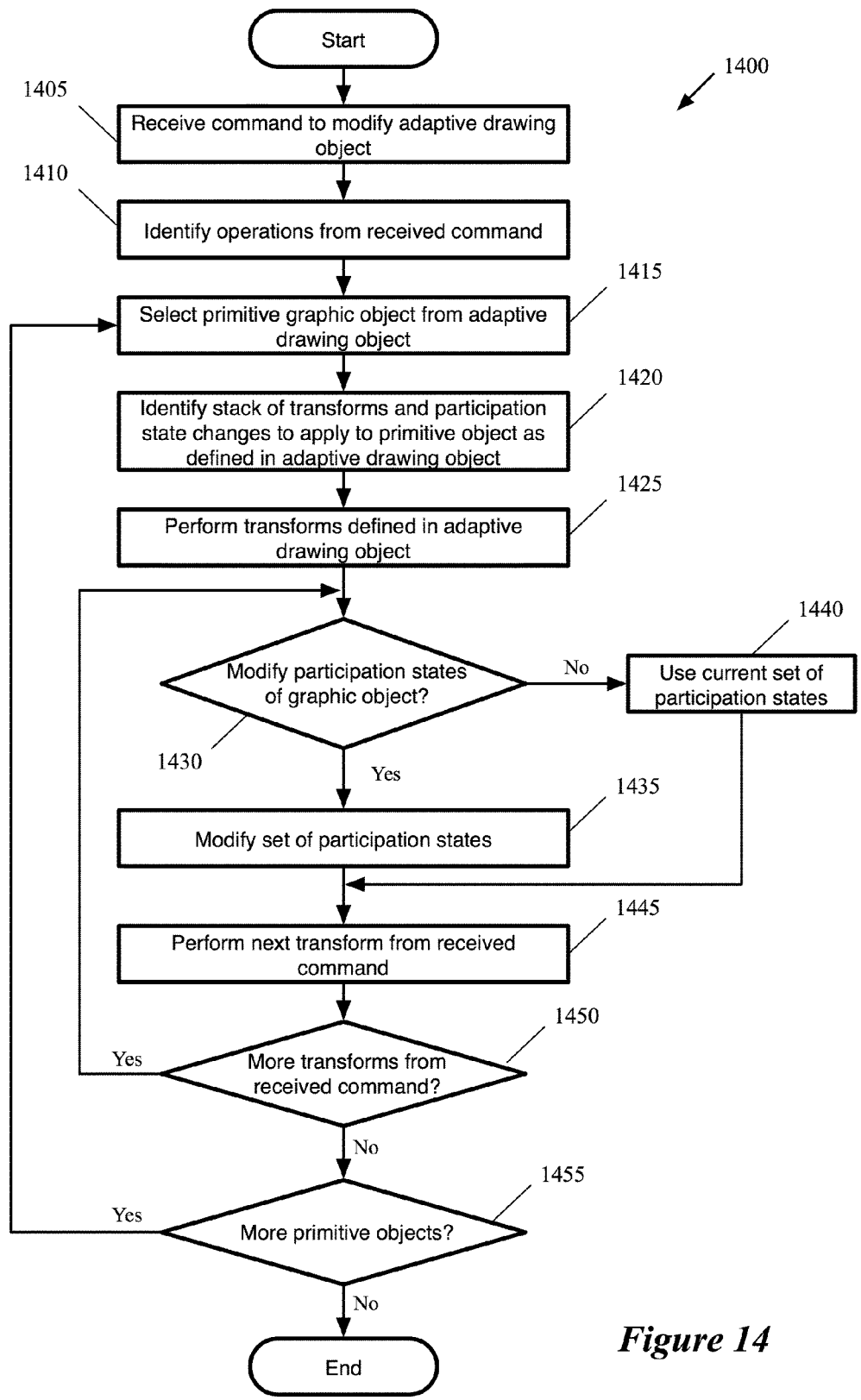
FIG. 14 conceptually illustrates a process of some embodiments for modifying an adaptive object according to a command from an application that uses the adaptive object.

FIG. 14 conceptually illustrates a process 1400 of some embodiments for modifying an adaptive drawing object according to a command from an application that uses the adaptive object. In some embodiments, the process 1400 is performed by one or more methods on the adaptive object (e.g., methods to decompose transforms into primitives, methods to apply transforms, methods to modify participation states of the object, etc.).

As shown, the process 1400 begins by receiving (at 1405) a command to modify an adaptive drawing object. The adaptive drawing object, as described in detail above, may be a collection of individual graphic objects (e.g., primitive graphic objects, collections of graphic objects such as nested adaptive drawing objects, etc.). The command may be received from the application as part of the process of the application displaying the object in its own user interface or display window. The command may also be in response to user input through the application.

The process 1400 then identifies (at 1410) operations included in the received command. The command may include multiple operations to transform the adaptive drawing object, modify the participation states of the individual objects, etc. As illustrated in FIGS. 12 and 13, these operations are applied at the top of a tree of such operations that are part of the adaptive object definition. Thus, a change in the participation state will generally affect all of the individual objects in the adaptive drawing object. However, in some embodiments, the structure of the adaptive drawing object is made open to the application, which can modify the stack of operations applied to an individual object and thereby modify the participation states of the individual object.

Next, the process selects (at 1415) a primitive graphic object from the adaptive drawing object. As described above, because the participation states for the individual objects may be different, each of the individual objects in the adaptive drawing object may be affected differently by the transform. The order in which the individual objects are selected may be random, or may be part of the definition of the adaptive drawing object. The adaptive drawing object may define a drawing order (also called a z-order) for the different objects that determines which objects are on top of the other objects when displayed, and this may determine the order in which the objects are transformed for display (with the lower objects transformed first).

The process 1400 then identifies (at 1420) a stack of transforms and participation state changes to apply to the selected primitive object as defined in the adaptive drawing object. This may involve traversing a tree structure of transforms such as that illustrated in FIG. 9 to identify the specific transforms to apply to the object and the participation states of the object at the time each transform is applied. The process then performs (at 1425) the transforms for the primitive object as defined in the adaptive drawing object. The process of applying a transform to a single object is described in further detail in FIG. 15 below.

Next, the process 1400 determines (at 1430) whether to modify the participation states of the selected primitive graphic object. As described, in some embodiments the command received to modify the adaptive drawing object may include a modification to the participation states of the individual objects (for instance, the command shown in FIG. 13).

When the command requires a modification to the states of the graphic object, the process modifies (at 1435) the set of participation states of the selected graphic object as required. As described in Section II above, this may be the assignment of a new array of participation states to the graphic object, or the modification of the values at specific indices of the array. Otherwise, the process uses (at 1440) the current set of participation states for the selected graphic object. This may be the output set of participation states from the adaptive drawing object, or a modified set from a previous operation of the received command.

The process then performs (at 1445) the next transform from the received command. As mentioned above, FIG. 15, described below, illustrates one process for applying a transform to a single object. The application of a transform may involve decomposing the transform into its primitive transforms and then applying only the primitive transforms indicated by the participation states of the graphic object.

Next, the process 1400 determines (at 1450) whether more transforms from the received command remain to be applied. A single command from a software agent might include multiple transforms. In fact, the software agent might modify a first set of participation states for a first transform class and then apply a specific transform of the first transform class, then subsequently modify a second set of participation states for a second transform class and then apply a specific transform of the second transform class. When more transforms remain, the process returns to 1430 to determine whether any participation states need to be modified.

When all of the transforms have been applied to the selected graphic object, the process determines (at 1455) whether all of the graphic objects that make up the adaptive drawing object have been transformed. When additional graphic objects remain, the process returns to 1415 to select the next object. Otherwise, the process ends.

One of ordinary skill in the art will recognize that the process 1400 is a conceptual process, and that some embodiments will perform an equivalent process using a different order of operations. For instance, some embodiments do not individually perform all the transforms on a single graphic object, but rather would traverse the tree of operations in a manner that applies each operation only once. For instance, referring to the adaptive drawing object 900 of FIG. 9, some embodiments would apply the participation state change operation 925 to graphic w 905 first, then apply transform operation 935 to graphic x 910, then apply transform operation 930 to each of the graphic objects 905 and 910, then apply transform operation 945 to graphic object y 915, and so on, until the entire operations tree is traversed. Two example processes for applying a particular transform to multiple graphic objects are described below by reference to FIGS. 17 and 19.

Figure 15:
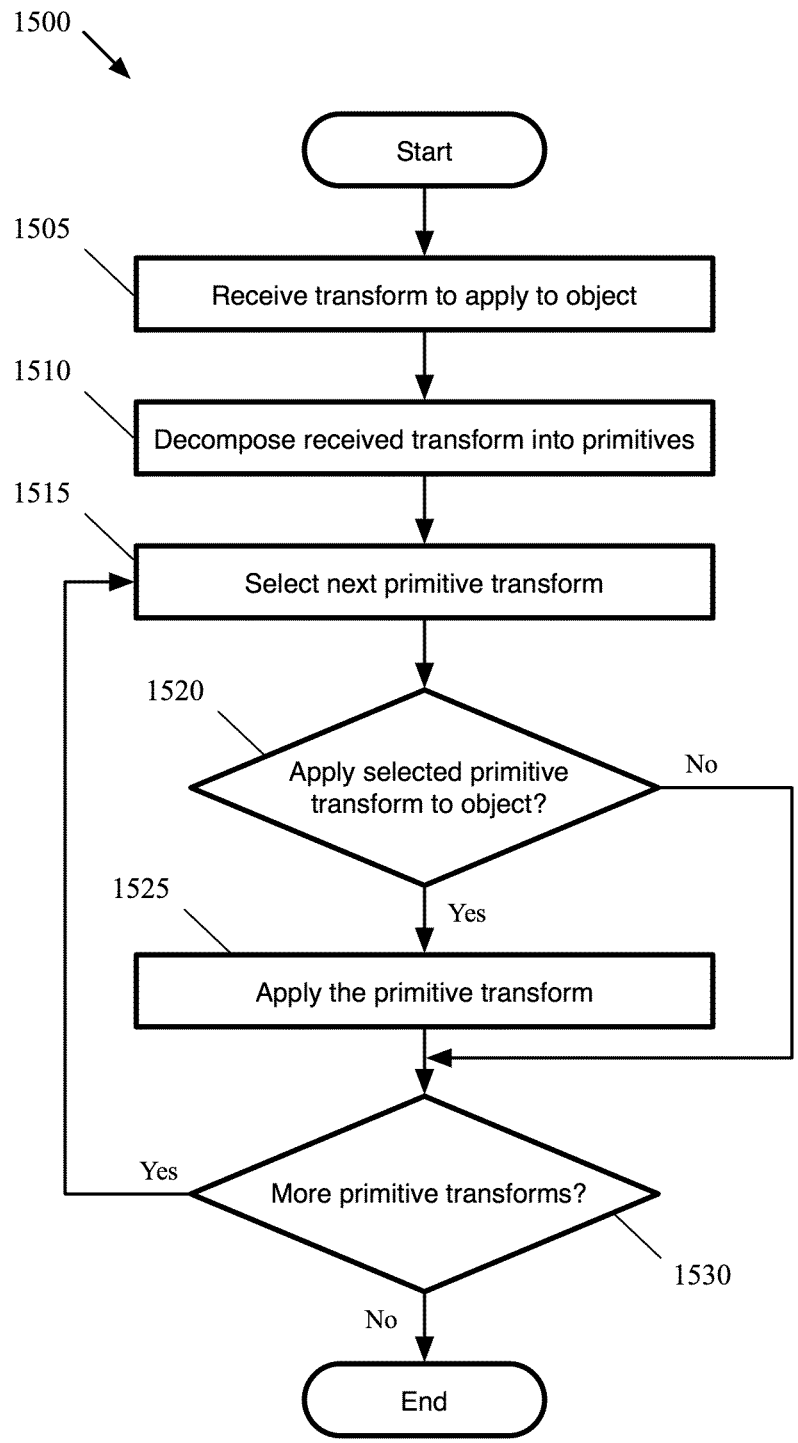
FIG. 15 conceptually illustrates a process of some embodiments for applying a transform (that falls into a class for which primitive transforms have been defined) to an object for which participation states for the primitive transforms are defined.

As shown in process 1400, transforms will regularly be applied to an object according to the participation states of the object. FIG. 15 conceptually illustrates a process 1500 of some embodiments for applying a transform (that falls into a class for which primitive transforms have been defined) to an object for which participation states for the primitive transforms are defined. The process 1500 will be described by reference to FIG. 16, which illustrates the application of a 2D affine transform T to a graphic object 1600 (a five-pointed star) in six stages 1605-1630. The six stages illustrate the object 1600 after the application of each of the transforms.

Figure 16:
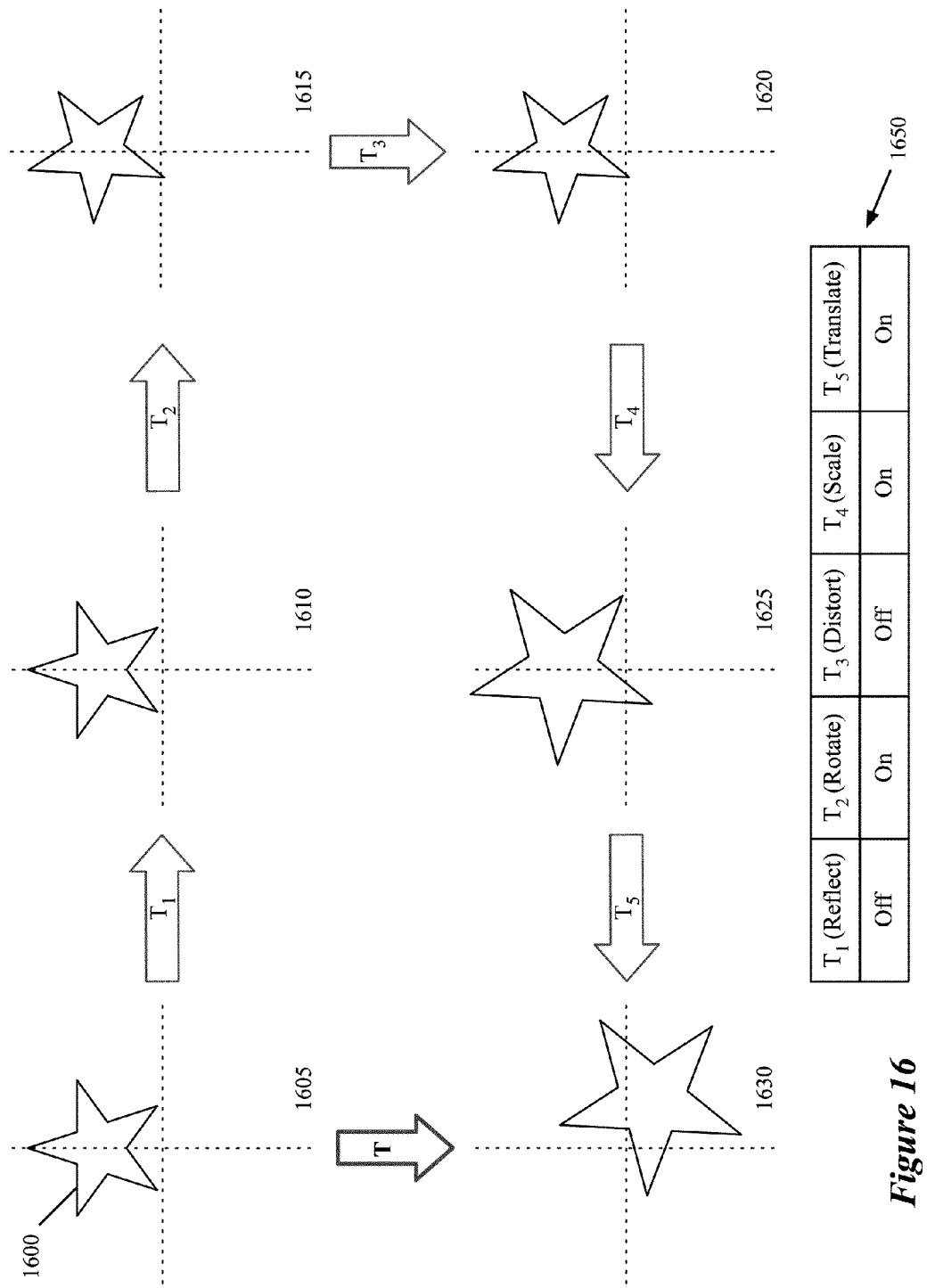
FIG. 16 illustrates the application of a 2D affine transform T to a graphic object (a five-pointed star) in six stages.

In addition, FIG. 16 also illustrates a table 1650 that indicates a set of participation states for the graphic object 1600. For each particular primitive transform $T_1$-$T_5$, the table 1650 indicates whether an application should apply the particular primitive transform to graphic object 1600. As shown, the graphic object 1600 participates in rotation, scaling, and translation transforms, but does not participate in reflection and distortion transforms.

In some embodiments, the set of participation states for the graphic object is determined as an operation or set of operations encoded in an adaptive drawing object that contains the graphic object. Some embodiments define an array of participation states that is associated with the object; the array indicates either "on" or "off" for each primitive transform, in a particular order. As described above, these participation states may be modified through a stack of transforms and other operations that are applied to the object as coded in an adaptive drawing object that includes the particular object.

In some embodiments, the process 1500 is performed by one or more methods on the object, which may or may not be exposed as part of the API (e.g., methods to decompose a transform, methods to re-compose a transform using a given set of participation states, methods to apply the transform to the object, etc.). The process may be performed in response to a command from a software application that modifies a layout for display on an electronic display device (e.g., a computer monitor, a laptop screen, a touchscreen device such as a smartphone or tablet computer, etc.). The layout may be an entire screen (e.g., a desktop layout), a window within a screen (e.g., a browser window), etc. In some embodiments, an application applies a transform to the graphic object through an API. The API provides the adaptive drawing object that includes the graphic object to the application.

As shown in FIG. 15, the process 1500 begins by receiving (at 1505) a transform to apply to a graphic object. In some embodiments, the transform may be any transform in any class (e.g., 2D affine transforms, 3D non-affine transforms, etc.) for which a decomposition is defined. Some embodiments restrict the type of transforms for which process 1500 can be performed to a specific class of transforms. In some embodiments, the received transform is defined by a matrix operation to be performed on each coordinate in the graphic object (e.g., Equation (1) from the previous section). The transform may be the result of user input in some cases (e.g., user input to zoom in on a portion of a layout). The object to which the process applies the transform may be a user interface item (e.g., a slider, an icon, selection handles, etc.), text content, graphical content (an image, vector graphics, etc.), or any other displayed object.

The process then decomposes (at 1510) the received transform into a set of primitive transforms. Some embodiments define the decomposition in advance, as described above in Section I (e.g., by equations (2)-(18)). The decomposition defines primitive transform matrix operations based on the values of the matrix operation of the received transform. For example, a transform that performs rotation only will only have one primitive transform (using the example for 2D affine transforms described in Section I) that has an effect on the object, which will be the same as the transform itself. All other primitive transforms will simply be the identity matrix $$\left(\text{e.g., } T_N \begin{pmatrix} x \\ y \end{pmatrix} = \begin{pmatrix} 1 & 0 \\ 0 & 1 \end{pmatrix} \begin{pmatrix} x \\ y \end{pmatrix}\right).$$

However, often a rotation transformation will actually involve rotating an entire layout about a point that is not the object center for some objects. In such a case, the transformation will actually decompose into both a rotation about the center of the object and a translation.

Next, process 1500 selects (at 1515) a primitive transform. In some embodiments, an order of application is defined for the primitive transforms (e.g., when the transforms do not commute), and the process selects the transforms in this particular order. Even when the primitive transforms commute, an order may be defined for the primitive transforms to correspond to the indices of an array defined for the graphic object that indicates whether each primitive transform applies to the particular graphic object.

The process determines (at 1520) whether to apply the selected primitive transform to the object. In some embodiments, the process uses a value stored in an array associated with the object to determine whether to apply the selected primitive transform. As described, an array (such as illustrated in table 1650 of FIG. 16) indicates the participation state of the object for each primitive transform. If the participation state is set to "on", then the primitive transform is applied to the object. If the participation state is set to "off", then the primitive transform is not applied to the object. Some embodiments represent these states as a value of 1 for "on" and a value of 0 for "off".

When the object's participation state for the transform is set to "on", then the process applies (at 1525) the primitive transform to the object. The process then determines (at 1530) whether any more primitive transforms remain for the object. The process cycles through operations 1515-1530 for each of the primitive transforms defined for the transform class to which the received transform belongs. Thus, for the primitive transforms described above for 2D affine transforms, the process 1500 would perform operations 1515-1530 five times each. The process then ends.

As mentioned, FIG. 16 illustrates the graphic object in six stages 1605-1630 as the various primitive transforms are applied. Coordinate axes are illustrated at each stage to indicate the relative location, orientation, and size of the object. The first stage 1605 shows the graphic object before the transform is applied. The second stage 1610 illustrates the graphic object 1600 after $T_1$ (reflection). Because the participation state for $T_1$ in table 1650 is set to "off", no transform is applied at this stage and the object is in the same position.

The third stage 1615 illustrates the graphic object 1600 after the application of primitive transform $T_2$ (rotation). In this case, the transform rotates object 1600 by approximately 10° to the left. Next, stage 1620 shows the graphic object 1600 after $T_3$ (distortion). As with $T_1$, the participation state for $T_3$ is set to "off", so no distortion transform is applied to the object.

Stage 1625 illustrates the graphic object 1600 scaled by a factor of approximately 1.33. The graphic object has its center at the same location as the previous stages, but is significantly larger at this stage. Finally, stage 1630 illustrates the object 1600 after the application of $T_5$ (translation). The translation factor of the transform moves the graphic object down and to the right.

Figure 19:
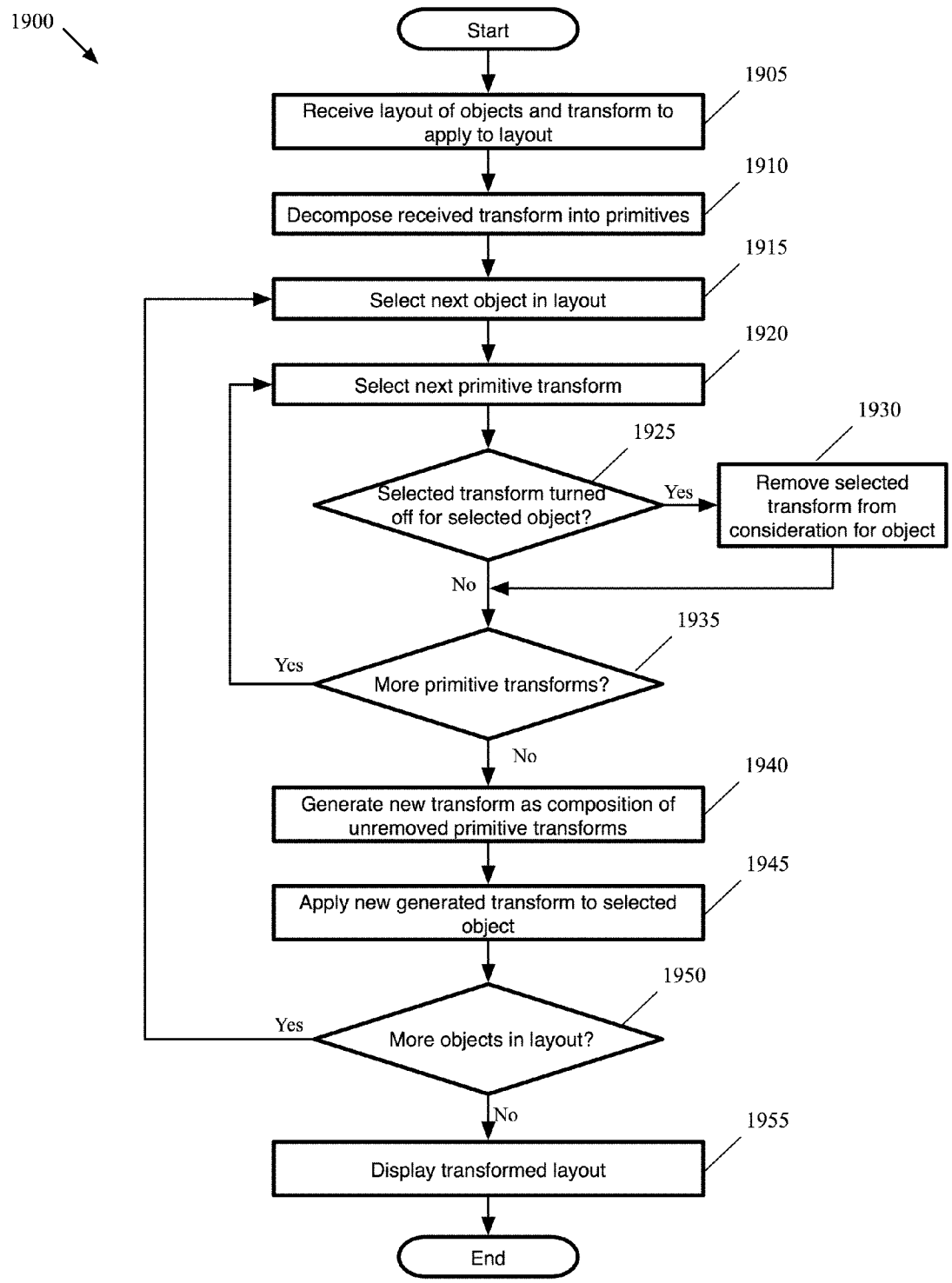
FIG. 19 conceptually illustrates a process of some embodiments for applying a transform (that falls into a class for which primitive transforms have been defined) to a layout with one or more graphic objects.

As shown by the bold arrow, the sixth stage 1630 illustrates the application of the primitive transforms of the transform T in which graphic object 1600 participates. Some embodiments, rather than applying each transform separately, identify the primitive transforms in which the object participates and then calculate a composition of the identified primitive transforms to apply to the object. The sixth stage 1630 illustrates the application of such a modified transform. FIG. 19, described below, illustrates an example of such a recomposition process in detail.

The process 1500 illustrates the application of a transform to a single graphic object. However, in many situations, a transform will be applied to an entire layout that includes numerous objects. For instance, a user might zoom in on an online map that includes various images as well as user interface items, all of which may have different sets of participation states for a set of primitive transforms (e.g., identification markers that will translate with the map but not rotate or scale, and a compass symbol that will rotate with the map but not scale or translate).

Figure 17:
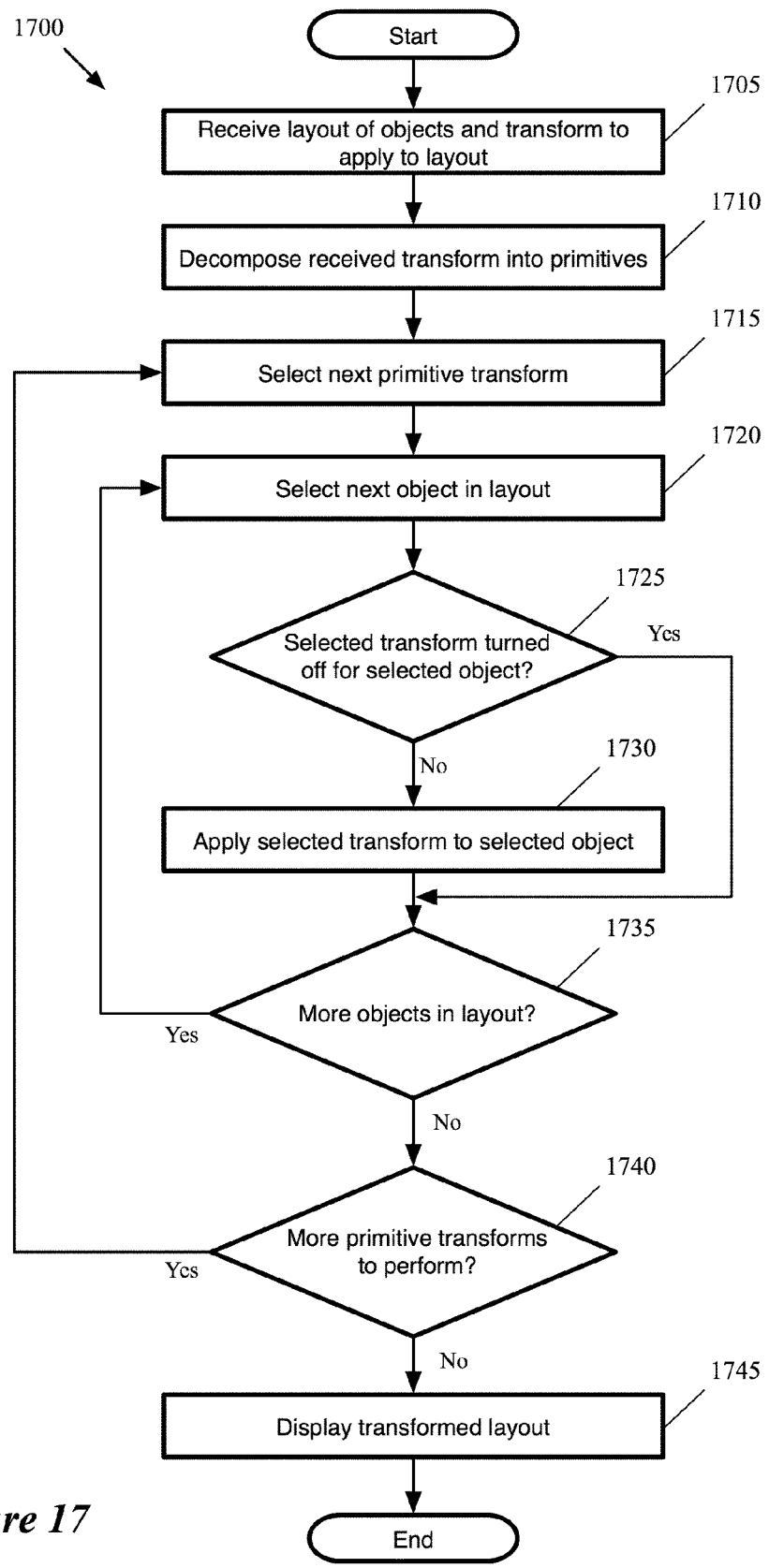
FIG. 17 conceptually illustrates a process for applying a transform (that falls into a class for which primitive transforms have been defined) to a layout that includes one or more graphic objects.

FIG. 17 conceptually illustrates a process 1700 for applying a transform (that falls into a class for which primitive transforms have been defined) to a layout that includes one or more graphic objects. The process 1700 is similar to the process 1500, but applies to a layout with multiple items. As will be described, the process 1700 applies a first primitive transform to all objects in the layout, then applies the next primitive transform to all of the objects in the layout, and so on for each primitive transform. One of ordinary skill in the art will recognize that some embodiments apply all the primitive transforms to a first object, then all the primitive transforms to a second object, and so on for each object. In addition, some embodiments apply only a single transform to a particular object, based on the participation states of the particular object.

Figure 18:
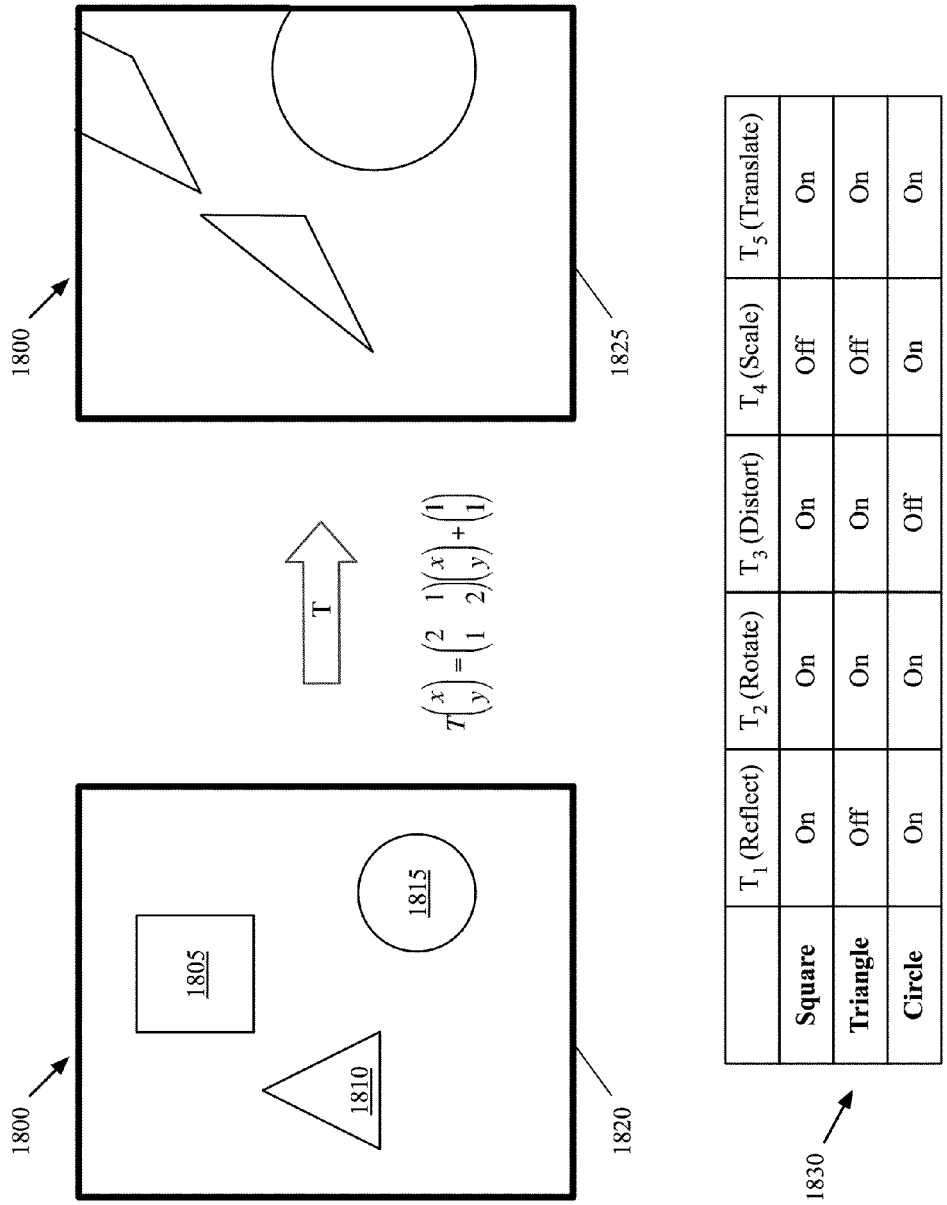
FIG. 18 illustrates a layout that includes three graphic objects: a square, a triangle, and a circle.

The process 1700 will be described in part by reference to FIG. 18, which illustrates a layout 1800 that includes three graphic objects 1805 (a square), 1810 (a triangle), and 1815 (a circle). Rather than illustrating the transformation of the layout in a series of numerous stages, FIG. 18 shows two stages 1820 and 1825, before and after the application of a 2D affine transformation T. In this case, as shown in the figure, the transformation T is represented by the following equation:

$$T\begin{pmatrix} x \\ y \end{pmatrix} = \begin{pmatrix} 2 & 1 \\ 1 & 2 \end{pmatrix} \begin{pmatrix} x \\ y \end{pmatrix} + \begin{pmatrix} 1 \\ 1 \end{pmatrix} \tag{42}$$

FIG. 18 also illustrates a table 1830 that indicates a set of participation states for each of the objects 1805-1815. For each particular primitive transform $T_1$-$T_5$ (using the decomposition described above in Section I), the table 1830 indicates whether an application should apply the particular primitive transform to each of the graphic objects in the layout. As shown, the square 1805 participates in all primitive transforms except for $T_4$ (scaling), the triangle 1810 only participates in primitive transforms $T_2$, $T_3$, and $T_5$ (rotation, distortion, and translation), while the circle 1815 participates in all primitive transforms except $T_3$ (distortion).

As mentioned above, each of the graphic objects might have been defined by a software designer to have the illustrated participation states for the five primitive transforms. Thus, any layout that includes one or more of the illustrated graphic objects 1805-185 may be transformed by any software application and the graphic objects will only be affected by the primitive transforms in which they participate. As described, when the software designer defines the graphic object, they may define the appearance, interaction properties, or other properties of the graphic object, along with the participation states. In some embodiments, the different graphic objects are defined by different software designers (e.g., different companies) and can be transformed by software agents from different software designers.

In some embodiments, the process 1700 is performed by one or more methods on an adaptive drawing object (e.g., methods to decompose a transform, methods to re-compose a transform using a given set of participation states, methods to apply the transform to the object, etc.) in response to a command from such a software agent to modify an adaptive drawing object (e.g., layout 1800) for display on an electronic display device. The layout may be an entire screen, a window within a screen, etc. As shown in FIG. 17, the process 1700 begins by receiving (at 1705) a layout of objects and a transform to apply to the layout. In some embodiments, the transform may be any transform in any class (e.g., 2D affine transforms, 3D non-affine transforms, etc.) for which a decomposition is defined. Some embodiments restrict the type of transforms for which process 1700 can be performed to a specific class of transforms. In some embodiments, the received transform is defined by a matrix operation to be performed on each coordinate in the graphic object (e.g., Equation (1) from the previous section). The transform may be the result of user input in some cases (e.g., user input to zoom in on a portion of a layout). The objects to which the process applies the transform may include user interface items (e.g., a slider, an icon, selection handles, etc.), text content, graphical content (an image, vector graphics, etc.), or any other displayed object. In the example illustrated in FIG. 18, the layout 1800 includes three items, the square 1805, triangle 1810, and circle 1815, as mentioned above. The transform T is represented by Equation (42), shown above.

The process 1700 next decomposes (at 1710) the received transform into a set of primitive transforms. Some embodiments define the decomposition in advance, as described above in Section I (e.g., by equations (2)-(18)). The decomposition defines primitive transform matrix operations based on the values of the matrix operation of the received transform. For example, a transform that performs rotation only will only have one primitive transform (using the example for 2D affine transforms described in Section I) that has an effect on the object, which will be the same as the transform itself. All other primitive transforms will simply be the identity matrix $$\left(\text{e.g., } T_N\begin{pmatrix}x\\y\end{pmatrix}=\begin{pmatrix}1 & 0\\0 & 1\end{pmatrix}\begin{pmatrix}x\\y\end{pmatrix}\right).$$

However, often a rotation transformation will actually involve rotating an entire layout about a point that is not the object center for some objects. In such a case, the transformation will actually decompose into both a rotation about the center of the object and a translation.

In the example of layout 1800, the 2D affine transform T is decomposed into the five primitive transforms described in Section I. Using the equations given in Section I, the parameters for this transform are $\sigma=1$, $\psi=\pi/4=45°$ (although ad-bc≥0, so there is no reflection), $\phi=\pi/4=45°$, $\theta=0$, $\lambda=\sqrt{3}\approx1/\sqrt{3}$, $\alpha=\sqrt{3}$, $\mu=1/\sqrt{3}$, $\mu=x_c+y_c+1$, and $\upsilon=x_c+y_c+1$. Thus, the applied transform decomposes into no reflection or rotation, a distortion that stretches objects by a factor of $\sqrt{3}$ along a 45° axis and squeezes the objects by a factor of $1/\sqrt{3}$ along the 135° axis, a scale that increases the size of objects by a factor of $\sqrt{3}$, and a translation that translates the objects by $x_c+y_c+1$ along both the x axis and the y axis.

The process 1700 selects (at 1715) a primitive transform. In some embodiments, an order of application is defined for the primitive transforms (e.g., if the transforms do not commute), and the process selects the transforms in this particular order. Even when the primitive transforms commute, an order may be defined for the primitive transforms to correspond to the indices of arrays defined for the graphic objects that indicate whether each primitive transform applies to the different graphic objects (e.g., the arrays represented by table 1830 of FIG. 18).

The process then selects (at 1720) one of the objects in the layout. Some embodiments select the graphic objects based on a drawing order for the layout; that is, a specification as to the order in which the various objects are drawn. In some embodiments, there is only a drawing order when the layout is a single entity itself (e.g., a page of a document, a web page, etc.), as opposed to an amalgam of graphic objects provided by different entities. Some embodiments select the graphic objects in an order from top left of the layout towards bottom right, or in some other visual order. Some embodiments select the graphic objects in a random order, and in some cases the order selected is dependent on the layout (e.g., randomly ordered for certain layouts and based on a drawing order or visual order for other layouts).

With an object selected for the current primitive transform, the process determines (at 1725) whether the selected transform is turned off for the selected object. As described, the graphic objects of some embodiments have a set of participation states defined (e.g., as an array associated with the graphic object). When the participation state for a particular primitive transform is set to "off", the particular primitive transform does not affect the object. For instance, as shown in table 1830, the triangle 1810 is not affected by primitive transforms $T_1$ and $T_4$ (reflection and scaling). In some cases, participation states may not be defined for a particular graphic object. In such a case, some embodiments automatically apply all primitive transforms to the particular graphic object.

When the current transform is not turned off for the object, the process applies (at 1730) the selected transform to the selected object. In some embodiments, this is a matrix operation performed for each point of the object (or a set of points of the object that define the object). The process then determines (at 1735) whether any more objects remain in the layout to which the currently selected primitive transform has not been applied. In the example of FIG. 18, the process 1700 would apply the transform to each of the three objects, unless of course the transform is one that is turned off for one or more of the objects. For instance, the process would apply the first transform (reflection) to the square 1805 and the circle 1810, although there is no reflection for the given transform because the value ad-bc is positive. When additional graphic objects remain, the process returns to 1720 to select the next object in the layout.

Once the primitive transform is applied (or not applied, in the case of "off" participation states) to each of the objects in the layout, the process 1700 determines (at 1740) whether additional primitive transforms remain for the process to perform. When additional primitive transforms remain, the process returns to 1715 to select the next primitive transform.

Once all of the primitive transforms are applied according to the participation states of the graphic objects in the layout, a new transformed version of the layout has been generated. The process 1700 then displays (at 1745) the transformed layout, or a portion of the transformed layout that fits in the display. In some embodiments, this entails sending the layout to a module that prepares the layout for display on a particular display device, or sending the layout to the display device itself. Due to the transforms, some of the graphic objects in the layout may be moved to a position that does not fit in the display. For instance, if the transform is a zoom operation with a fixed display, objects towards the edge of the layout may be moved out of the display.

Stage 1825 of FIG. 18 illustrates the layout 1800 after the application of the transform T represented by Equation (42) to the layout. As described above, this transform stretches objects by a factor of √3 along a 45° axis and squeezes the objects by a factor of 1/√3 along the 135° axis, increases the size of objects by a factor of √3, and translates the objects by $x_c+y_c+1$ along both the x axis and the y axis (where $x_c$ and $y_c$ are the coordinates of an object's center). Due to the participation state arrays for the objects that are shown in table 1830, only the transforms $T_3$ and $T_5$ (distortion and translation) affect the square 1805 and triangle 1810, while only the transforms $T_4$ and $T_5$ (scaling and translation) affect the circle 1815.

The layout at stage 1825 shows that the square 1805 and triangle 1810 have been distorted (and in fact, the object 1805 is no longer a square as a result of this distortion) and the circle 1815 is now larger. In addition, the objects have all moved up and to the right. In this case, the origin of the coordinate system is in the bottom left corner of the layout, so the square 1805 moves further (as its $x_c$ and $y_c$ values are larger).

As described above, the processes 1500 and 1700 describe each primitive transform being applied separately to the graphic objects. Some embodiments, however, use the original transform and the participation states of a graphic object to generate a transform particular to the graphic object. FIG. 19 conceptually illustrates such a process 1900 of some embodiments for applying a transform (that falls into a class for which primitive transforms have been defined) to a layout with one or more graphic objects.

Like processes 1500 and 1700, the process 1900 is performed by one or more methods on an adaptive drawing object (e.g., methods to decompose a transform, methods to re-compose a transform using a given set of participation states, methods to apply the transform to the object, etc.) in response to a command from such a software agent to modify an adaptive drawing object (e.g., layout 1800) for display on an electronic display device. The layout may be an entire screen, a window within a screen, etc. As shown, the process 1900 begins by receiving (at 1905) a layout of objects and a transform to apply to the layout. In some embodiments, the transform may be any transform in any class (e.g., 2D affine transforms, 3D non-affine transforms, etc.) for which a decomposition is defined. Some embodiments restrict the type of transforms for which process 1900 can be performed to a specific class of transforms. In some embodiments, the received transform is defined by a matrix operation to be performed on each coordinate in the graphic object (e.g., Equation (1) from the previous section). The transform may be the result of user input in some cases (e.g., user input to zoom in on a portion of a layout). The objects to which the process applies the transform may include user interface items (e.g., a slider, an icon, selection handles, etc.), text content, graphical content (an image, vector graphics, etc.), or any other displayed object.

The process 1900 next decomposes (at 1910) the received transform into a set of primitive transforms. Some embodiments define the decomposition in advance, as described above in Section I (e.g., by equations (2)-(18)). The decomposition defines primitive matrix operations based on the values of the matrix operations of the received transform. For example, a transform that performs rotation only will only have one primitive transform (using the example for 2D affine transforms described in Section I) that has an effect on the object, which will be the same as the transform itself. However, often a rotation transformation will actually involve rotating an entire layout about a point that is not the object center for some objects. In such a case, the transformation will actually decompose into both a rotation about the center of the object and a translation.

In the example of layout 1800, the 2D affine transform is decomposed into the five primitive transforms described in Section I. As described above by reference to process 1700, the parameters for this transform are σ=1, ψ=π/4=45° (although ad-bc≥0, so there is no reflection), φ=π/4=45°, θ=0, λ=√3, β=1/√3, μ=$x_c+y_c+1$, and υ=$x_c+y_c+1$. The five transforms are as follows:

$$T_1\begin{pmatrix}x\\y\end{pmatrix} = \begin{pmatrix}1 & 0\\0 & 1\end{pmatrix}\begin{pmatrix}x\\y\end{pmatrix}, \quad (43)$$

the identity transform as there is no reflection because $ad - bc \geq 0$;

$$T_2\begin{pmatrix}x\\y\end{pmatrix} = \begin{pmatrix}x_c\\y_c\end{pmatrix} + \begin{pmatrix}\cos 0 & \sin 0\\\sin 0 & \cos 0\end{pmatrix} \circ \left(\begin{pmatrix}-x_c\\-y_c\end{pmatrix} + \begin{pmatrix}x\\y\end{pmatrix}\right) \quad (44)$$

$$= \begin{pmatrix}1 & 0\\0 & 1\end{pmatrix}\begin{pmatrix}x\\y\end{pmatrix},$$

also the identity transform;

$$T_3\begin{pmatrix}x\\y\end{pmatrix} = \begin{pmatrix}x_c\\y_c\end{pmatrix} + \begin{pmatrix}\cos\frac{\pi}{4} & -\sin\frac{\pi}{4}\\\sin\frac{\pi}{4} & \cos\frac{\pi}{4}\end{pmatrix} \circ \begin{pmatrix}\sqrt{3} & 0\\0 & \frac{1}{\sqrt{3}}\end{pmatrix} \circ \quad (45)$$

$$\begin{pmatrix}\cos -\pi/4 & -\sin -\pi/4\\\sin -\pi/4 & \cos -\pi/4\end{pmatrix} \circ$$

$$\left(\begin{pmatrix}-x_c\\-y_c\end{pmatrix} + \begin{pmatrix}x\\y\end{pmatrix}\right)$$

$$= \begin{pmatrix}x_c\\y_c\end{pmatrix} + \begin{pmatrix}\frac{1}{\sqrt{2}} & -\frac{1}{\sqrt{2}}\\\frac{1}{\sqrt{2}} & \frac{1}{\sqrt{2}}\end{pmatrix} \circ \begin{pmatrix}\sqrt{3} & 0\\0 & \frac{1}{\sqrt{3}}\end{pmatrix} \circ$$

$$\begin{pmatrix}\frac{1}{\sqrt{2}} & \frac{1}{\sqrt{2}}\\-\frac{1}{\sqrt{2}} & \frac{1}{\sqrt{2}}\end{pmatrix} \circ \begin{pmatrix}x - x_c\\y - y_c\end{pmatrix}$$

$$= \begin{pmatrix}x_c\\y_c\end{pmatrix} + \begin{pmatrix}\frac{2}{\sqrt{3}} & -\frac{1}{\sqrt{3}}\\\frac{1}{\sqrt{3}} & \frac{2}{\sqrt{3}}\end{pmatrix} \circ \begin{pmatrix}x - x_c\\y - y_c\end{pmatrix}$$

$$T_4\begin{pmatrix}x\\y\end{pmatrix} = \begin{pmatrix}x_c\\y_c\end{pmatrix} + \begin{pmatrix}\sqrt{3} & 0\\0 & \sqrt{3}\end{pmatrix} \circ \begin{pmatrix}x - x_c\\y - y_c\end{pmatrix} \quad (46)$$

$$T_5\begin{pmatrix}x\\y\end{pmatrix} = \begin{pmatrix}x\\y\end{pmatrix} + \begin{pmatrix}x_c + y_c + 1\\x_c + y_c + 1\end{pmatrix} \quad (47)$$

As can be seen, the rotation and reflection transforms are just the identity matrix, so there is no rotation or reflection. The distortion, scaling, and translation matrices, however, will have an effect on the layout objects 1805, 1810, and 1815.

After decomposing the received transform, the process 1900 diverges from the previously described process 1700 of FIG. 17. The process 1900 selects (at 1915) an object from the layout. Some embodiments select the graphic objects based on a drawing order for the layout; that is, a specification as to the order in which the various objects are drawn. In some embodiments, there is only a drawing order when the layout is a single entity itself (e.g., a page of a document, a web page, etc.), as opposed to an amalgam of graphic objects provided by different entities. Some embodiments select the graphic objects in an order from top left of the layout towards bottom right, or in some other visual order. Some embodiments select the graphic objects in a random order, and in some cases the order selected is dependent on the layout (e.g., randomly ordered for certain layouts and based on a drawing order or visual order for other layouts).

The process then selects (at 1920) a primitive transform. In some embodiments, an order of application is defined for the primitive transforms (e.g., if the transforms do not commute), and the process selects the transforms in this particular order. Even when the primitive transforms commute, an order may be defined for the primitive transforms to correspond to the indices of arrays defined for the graphic objects that indicate whether each primitive transform applies to the different graphic objects (e.g., the arrays represented by table 1830 of FIG. 18).

For the current graphic object, the process determines (at 1925) whether the selected transform is turned off. As described, the graphic objects of some embodiments have a set of participation states defined (e.g., as an array associated with the graphic object). When the participation state for a particular primitive transform is set to "off", the particular primitive transform does not affect the object. For instance, as shown in table 1830, the triangle 1810 is not affected by primitive transforms $T_1$ and $T_4$ (reflection and scaling). In some cases, participation states may not be defined for a particular graphic object. In such cases, some embodiments automatically apply all primitive transforms to the particular graphic object.

When the selected primitive transform is turned off for the current object, the process removes (at 1930) the primitive transform from consideration for the graphic object. In some embodiments, the process has a default transform that includes all of the primitive transforms (e.g., $T_5 \circ T_4 \circ T_3 \circ T_2 \circ T_1$), but from which primitive transforms can be removed for a particular object in accordance with the participation states of the particular object.

Next, the process determines (at 1935) whether more primitive transforms remain for the currently selected graphic object. The process cycles through each of the primitive transforms, determining the participation state of the graphic object and removing any primitive transforms for which the participation state is set to "off". In some embodiments, this involves reading the participation states out of an array and modifying the transform as necessary.

Once the process has identified the participation states for the graphic object and removed any necessary transforms, the process generates (at 1940) a new transform as a composition of the unremoved primitive transforms for the graphic object. The process then applies (at 1945) the new generated transform to the graphic object. In the example of FIG. 18, the primitive transforms are given by Equations (43)-(47). Using these, and noting that $T_1$ and $T_2$ are the identity function, the transforms applied to the three graphic objects of layout 1800 are:

$$T_s\begin{pmatrix}x\\y\end{pmatrix} = T_5 \circ T_3 \circ T_2 \circ T_1\begin{pmatrix}x\\y\end{pmatrix} \quad (48)$$

$$= T_5 \circ T_3\begin{pmatrix}x\\y\end{pmatrix}$$

$$= \begin{pmatrix}x_c+y_c+1\\x_c+y_c+1\end{pmatrix} + \begin{pmatrix}x_c\\y_c\end{pmatrix} + \begin{pmatrix}\frac{2}{\sqrt{3}} & \frac{1}{\sqrt{3}}\\ \frac{1}{\sqrt{3}} & \frac{2}{\sqrt{3}}\end{pmatrix} \circ \begin{pmatrix}x-x_c\\y-y_c\end{pmatrix}$$

$$= \begin{pmatrix}2x_c+y_c+1\\x_c+2y_c+1\end{pmatrix} + \begin{pmatrix}\frac{2}{\sqrt{3}} & \frac{1}{\sqrt{3}}\\ \frac{1}{\sqrt{3}} & \frac{2}{\sqrt{3}}\end{pmatrix} \circ \begin{pmatrix}x-x_c\\y-y_c\end{pmatrix};$$

$$T_t\begin{pmatrix}x\\y\end{pmatrix} = T_5 \circ T_3 \circ T_2\begin{pmatrix}x\\y\end{pmatrix} \quad (49)$$

$$= T_5 \circ T_3\begin{pmatrix}x\\y\end{pmatrix}$$

$$= \begin{pmatrix}x_c+y_c+1\\x_c+y_c+1\end{pmatrix} + \begin{pmatrix}x_c\\y_c\end{pmatrix} + \begin{pmatrix}\frac{2}{\sqrt{3}} & \frac{1}{\sqrt{3}}\\ \frac{1}{\sqrt{3}} & \frac{2}{\sqrt{3}}\end{pmatrix} \circ \begin{pmatrix}x-x_c\\y-y_c\end{pmatrix}$$

$$= \begin{pmatrix}2x_c+y_c+1\\x_c+2y_c+1\end{pmatrix} + \begin{pmatrix}\frac{2}{\sqrt{3}} & \frac{1}{\sqrt{3}}\\ \frac{1}{\sqrt{3}} & \frac{2}{\sqrt{3}}\end{pmatrix} \circ \begin{pmatrix}x-x_c\\y-y_c\end{pmatrix}; \text{ and}$$

$$T_c\begin{pmatrix}x\\y\end{pmatrix} = T_5 \circ T_4 \circ T_2 \circ T_1\begin{pmatrix}x\\y\end{pmatrix} \quad (50)$$

$$= T_5 \circ T_4\begin{pmatrix}x\\y\end{pmatrix}$$

$$= \begin{pmatrix}x_c+y_c+1\\x_c+y_c+1\end{pmatrix} + \begin{pmatrix}\sqrt{3} & 0\\ 0 & \sqrt{3}\end{pmatrix} \circ \begin{pmatrix}x-x_c\\y-y_c\end{pmatrix}$$

$$= \begin{pmatrix}x\sqrt{3}+x_c(1-\sqrt{3})+y_c+1\\x\sqrt{3}+x_c+y_c(1-\sqrt{3})+1\end{pmatrix}.$$

In the above equations (48)-(50), the transforms $T_s$, $T_t$, and $T_c$ are the new composed transforms that apply to the square 1805, triangle 1810, and circle 1815 respectively. Despite the square 1805 and triangle 1810 having different sets of participation states, the applied transforms are the same because there is no reflection transform. On the other hand, the circle has a different transform due to not participating in the distortion transform but participating in the scaling transform. One of ordinary skill in the art will note that the transforms of equations (48)-(50) simplify significantly when the object is centered at the origin of the transform T's coordinate system.

In FIG. 19, once the new generated transform is applied to the currently selected graphic object of the layout, the process 1900 next determines (at 1950) whether more objects in the layout remain to be transformed. As discussed above, some embodiments select the objects in a particular order (e.g., based on drawing order). Once all of the objects have been transformed, the process displays (at 1955) the transformed layout, or a portion of the transformed layout that fits in the display. In some embodiments, this entails sending the layout to a module that prepares the layout for display on a particular display device, or sending the layout to the display device itself. Due to the transforms, some of the graphic objects in the layout may be moved to a position that does not fit in the display. For instance, if the transform is a zoom operation with a fixed display, objects towards the edge of the layout may be moved out of the display.

IV. Examples of Adaptive Layouts

The above section described a number of different processes by which a software application or software agent applies a transform to a graphic object by factoring the transform into a set of primitive transforms and only applying a particular subset of the primitive transforms to the graphic object according to predefined properties of the graphic object. For instance, a software developer may design a user interface item or set of user interface items that should not participate in certain transforms that are applied to a layout including the user interface item (e.g., a zoom transform should not expand a UI item such that it takes up the entirety of a layout), regardless of the software agent acting on the user interface item.

Figure 20:
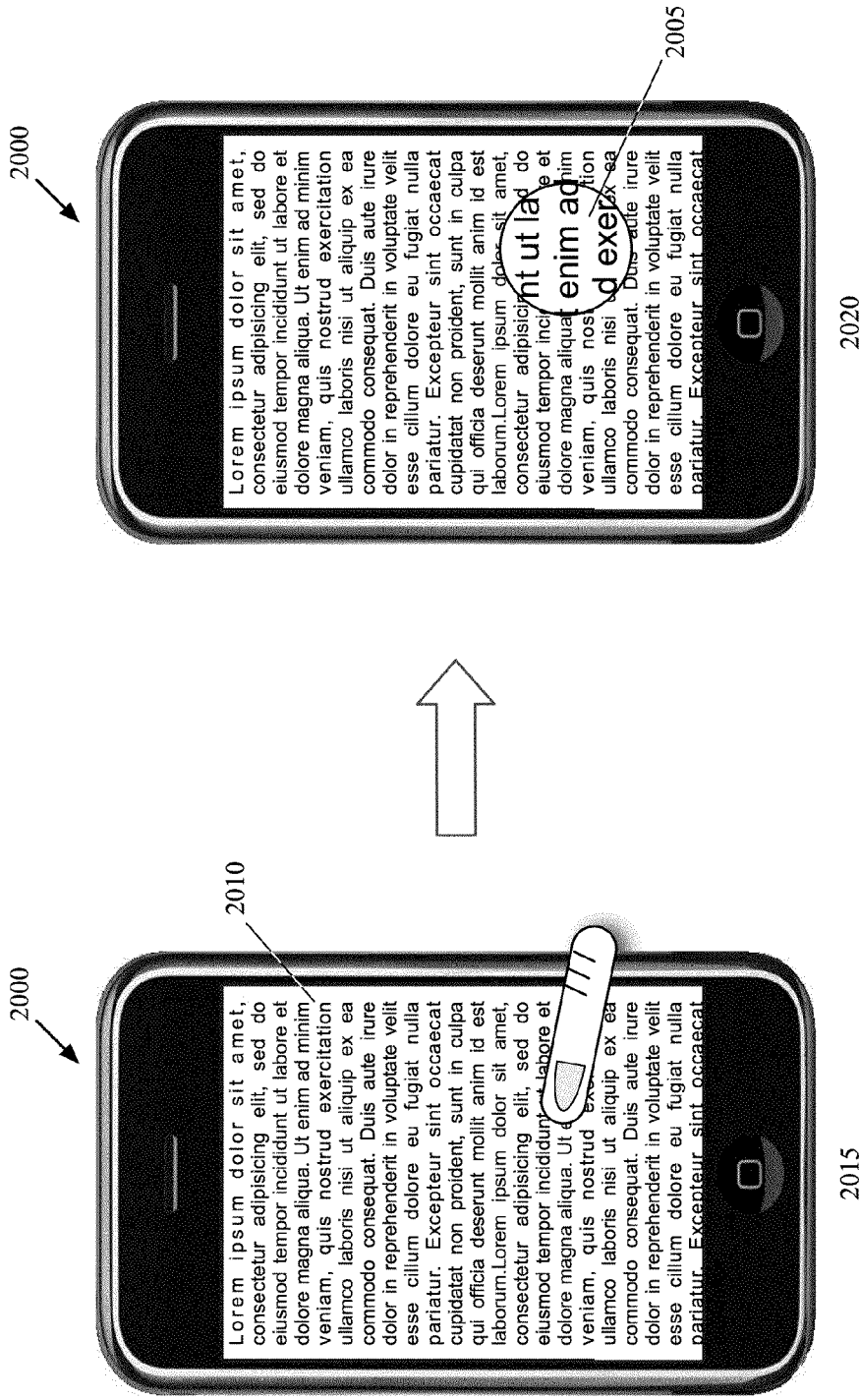
FIGS. 20 and 21 illustrate a user interface on a touchscreen device that includes a magnifying glass item as part of a layout.
Figure 21:
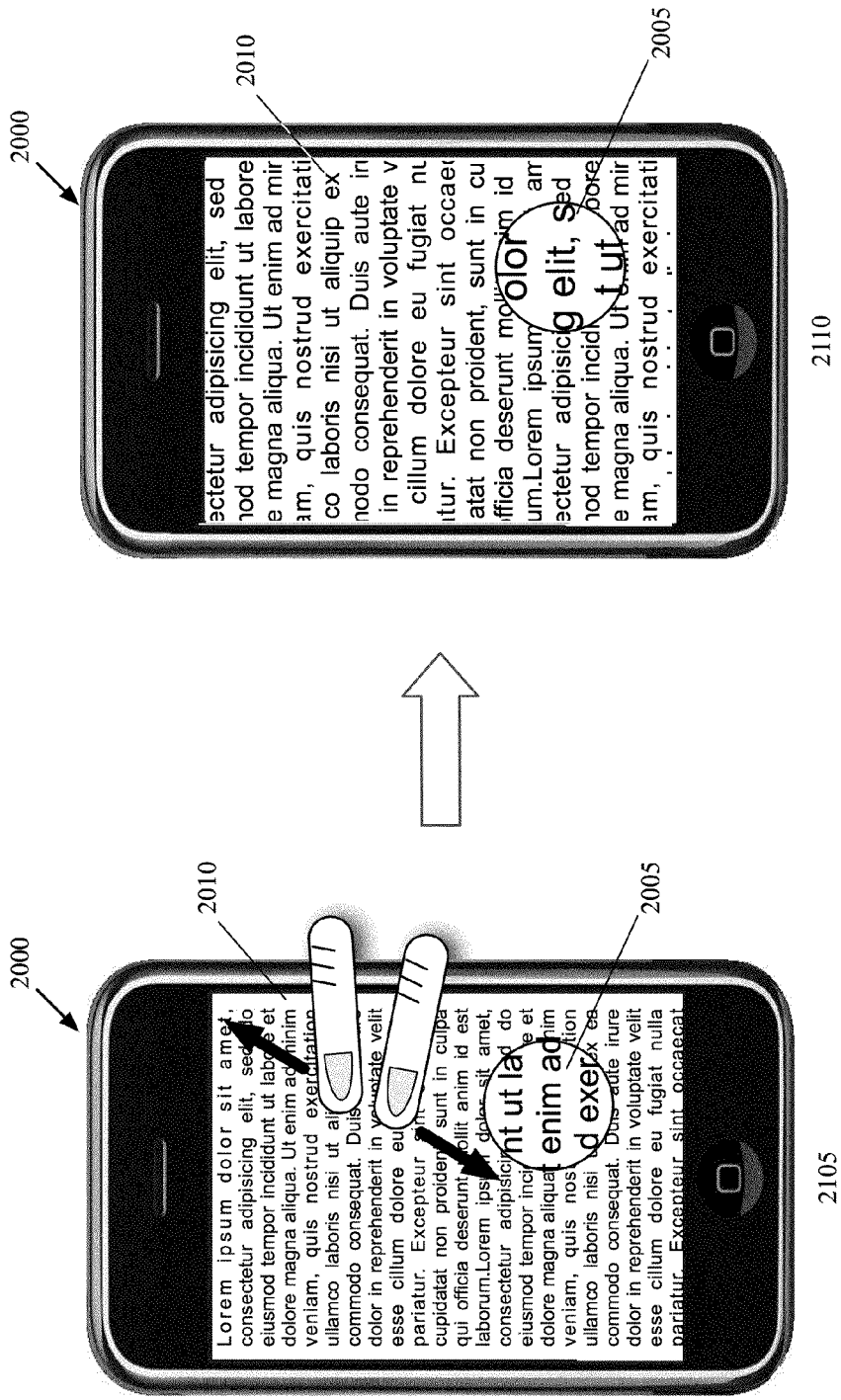

FIGS. 20 and 21 illustrate a user interface on a touchscreen device 2000 that includes a magnifying glass item 2005 as part of a layout 2010. FIG. 20 illustrates the initiation of the display of the magnifying glass item 2005 in two stages 2015 and 2020. Stage 2015 illustrates the layout 2010 (a textual layout) as a user places a finger over a location on the touchscreen device 2000. In some embodiments, holding a finger over a location for a particular length of time activates the magnifying glass UI item 2005. Stage 2020 illustrates the result of the activation of this item. The item magnifies the portion of the layout 2010 around its center, making it more easily visible.

FIG. 21 illustrates the result of a zoom operation applied to layout 2010 in two stages 2105 and 2110. At the first stage 2105, the user of the touchscreen device 2000 makes a touchscreen gesture with two fingers to zoom in on a particular location. In some embodiments, the device sets the location between the two fingers as the origin of the coordinate system for the transform. The device then decomposes the zoom operation into a set of primitive transforms. As the zoom operation is a 2D affine transform, the zoom operation can be decomposed using the exemplary set of primitive transforms described in Section I.

Using this set of primitives, the zoom operation decomposes into a scaling operation and a translation operation, as there is no rotation, reflection, or distortion. The magnifying glass item, however, does not participate in either of these two operations, as the magnifying glass is a user interface item with a fixed size, the position of which should not change unless directly modified by a user. Some embodiments enable a user to turn on the scale or translation operations of the magnifying glass item via input operations applied directly to the item. For instance, in some embodiments the user can move the magnifying glass along the layout (e.g., by moving a finger over the touchscreen), a translation operation applied only to the item. Similarly, some embodiments allow the user to change the size of the magnifying glass UI item.

In addition, the magnifying glass UI item 2005 will participate in rotations in certain situations. When the touchscreen device rotates 90°, some embodiments also rotate the entire displayed layout, including the UI item (which would not participate in the translation portion of such a transform. However, when the user rotates a layout without moving the touchscreen device itself, the magnifying glass does not participate in the rotation primitive transform.

As a result, stage 2110 of FIG. 21 shows that the device 2000 has zoomed in on the layout 2010 about the location between the user's two fingers as shown in stage 2105. The magnifying glass item 2005 has not changed its position or its size, as its participation state is set to "off" for the two primitive transforms affecting the layout.

Figure 22:
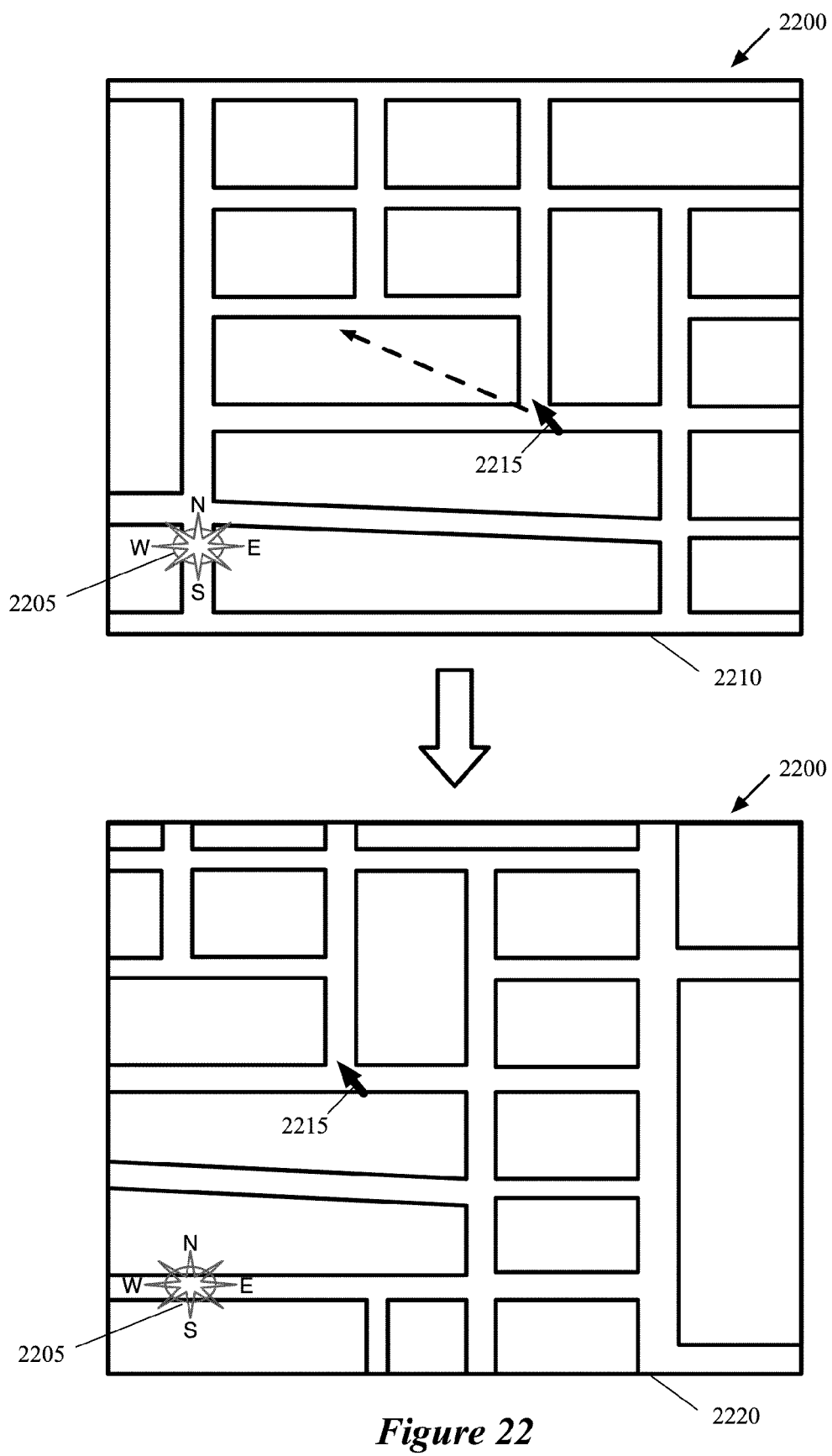
FIGS. 22-24 illustrate a display of a map that includes a compass rose and the effects of various transforms on the map and the compass rose.
Figure 23:
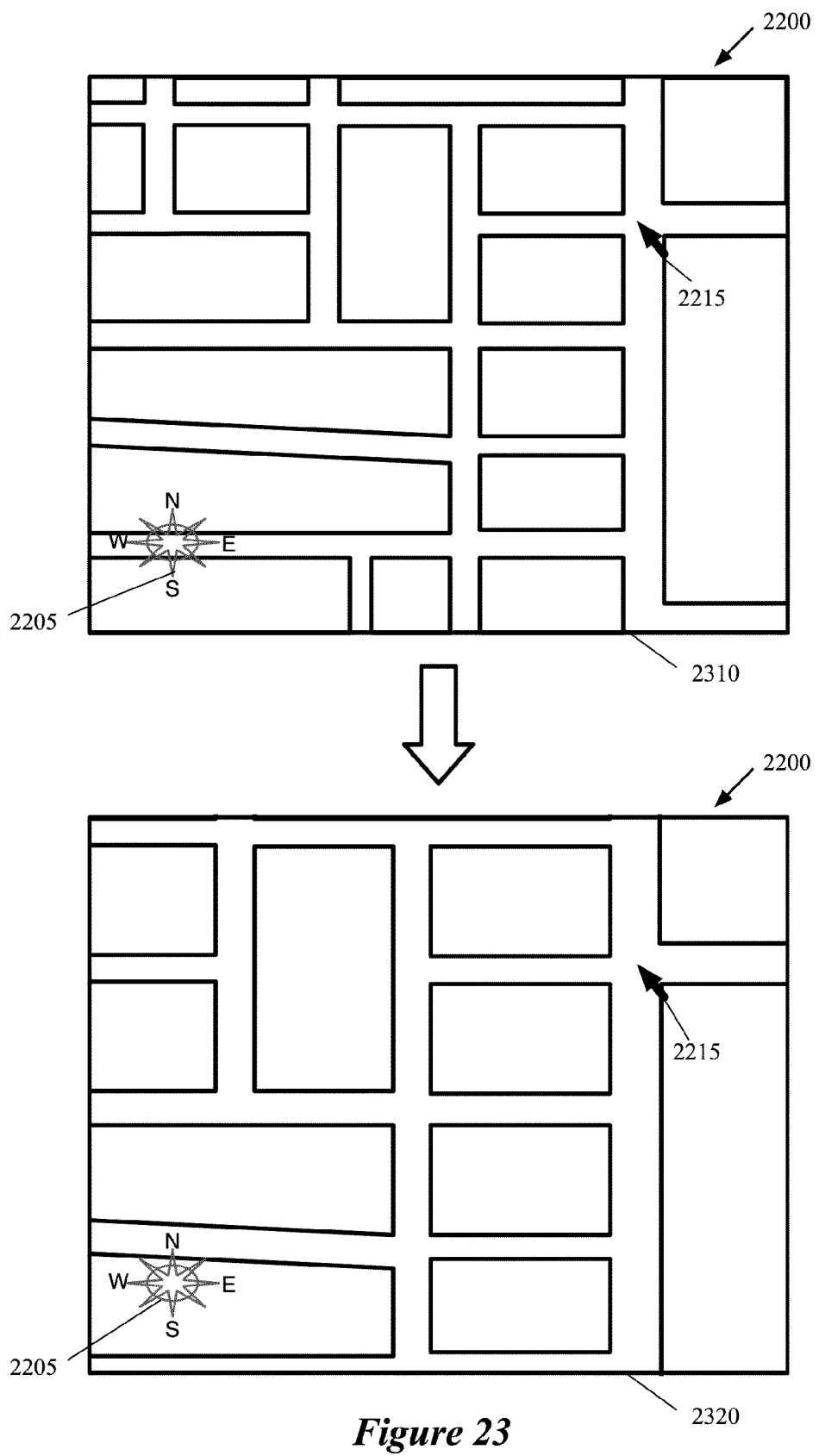
Figure 24:
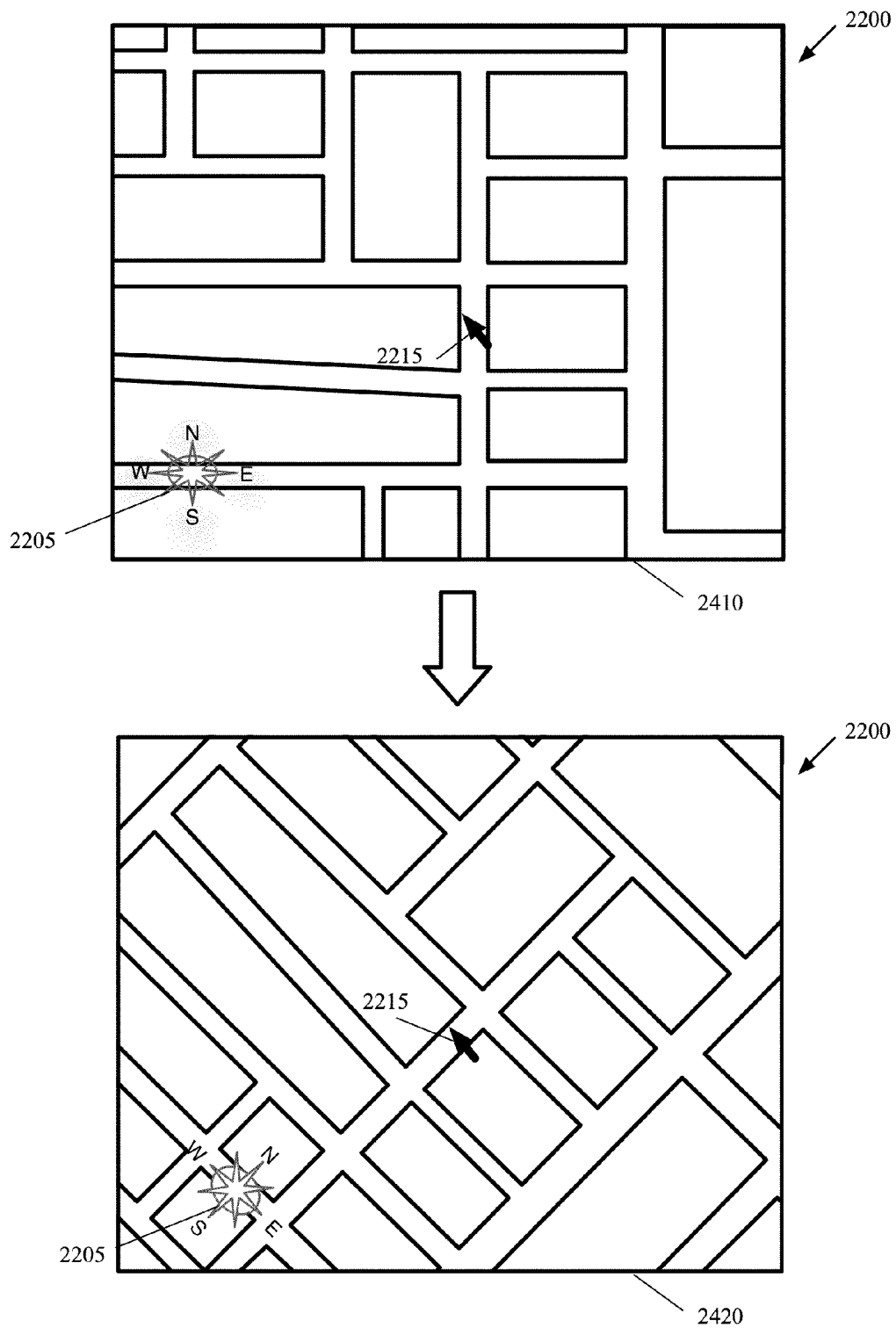

FIGS. 22-24 illustrate another example of user interface objects that are only affected by particular transforms. Specifically, these figures illustrate a display of a map 2200 (e.g., a display from an online map provider) that includes a compass rose 2205 and the effects of various transforms on the map and the compass rose.

FIG. 22 illustrates a translation operation applied to the map 2200 in two stages 2210 and 2220, in response to a user moving a cursor 2215 up and to the left. The movement of the cursor 2215 up and left (e.g., via a user selecting a button on a cursor controller device and then moving the cursor controller device) causes a corresponding translation of the map objects. In some embodiments, the map is drawn as a single object, while other embodiments draw the map as numerous separate objects. The translation transform shown in this figure does not involve any reflection, rotation, scaling, or distortion; the matrix operation for the translation primitive transform is the same as the matrix operation for the main transform. As shown at the second stage 2220, the map objects have moved up and to the left; however, the compass rose 2205 has not. The compass rose does not participate in the translation primitive transform, so it remains unaffected by the translation shown in FIG. 22. Were the compass rose to participate in such a transform, it could be moved off of the displayed area.

FIG. 23 illustrates a zoom operation applied to the map 2200 in two stages 2310 and 2320. The zoom operation is centered at the location of the cursor 2215, towards the upper right portion of the display. Through one of various possible forms of user input, the user causes the display to zoom in on the map 2200. As shown at stage 2320, the map objects are now larger than in stage 2310 and have moved away from the cursor 2215. The zoom operation factors into a scaling operation and a translation operation, with no reflection, rotation, or distortion. The compass rose 2205, however, is affected by neither of these two operations, and thus does not move in the display of the map.

Finally, FIG. 24 illustrates the application of a rotation operation to map 2200 in two stages 2410 and 2420. The rotation operation is centered at the location of the cursor 2215, towards the center of the display. Through one of various possible forms of user input, the user causes a 45° rotation of the map 2200. As shown at stage 2320, the map objects have rotated clockwise 45° around the cursor 2215. In addition, in this case, the compass rose 2205 has also rotated 45°, but without moving from the bottom left corner of the display. This is because the rotation operation factors into both rotation and translation primitive transforms, and the compass rose 2205 only participates in the rotation primitive transform.

The above examples (the magnifying glass UI item and the compass rose) are only two examples of objects that only participate in a subset of primitive transforms. Another such set of graphic objects are selection handles that do not scale or distort, but rotate, reflect, and translate with selected objects in a layout. Also, an orientation tool in a 3D universe (e.g., a compass plus plumb line) would participate in rotations in all dimensions, but not translations, scaling, or distortions, similar to the compass rose 2205.

V. Software Architecture

Figure 25:
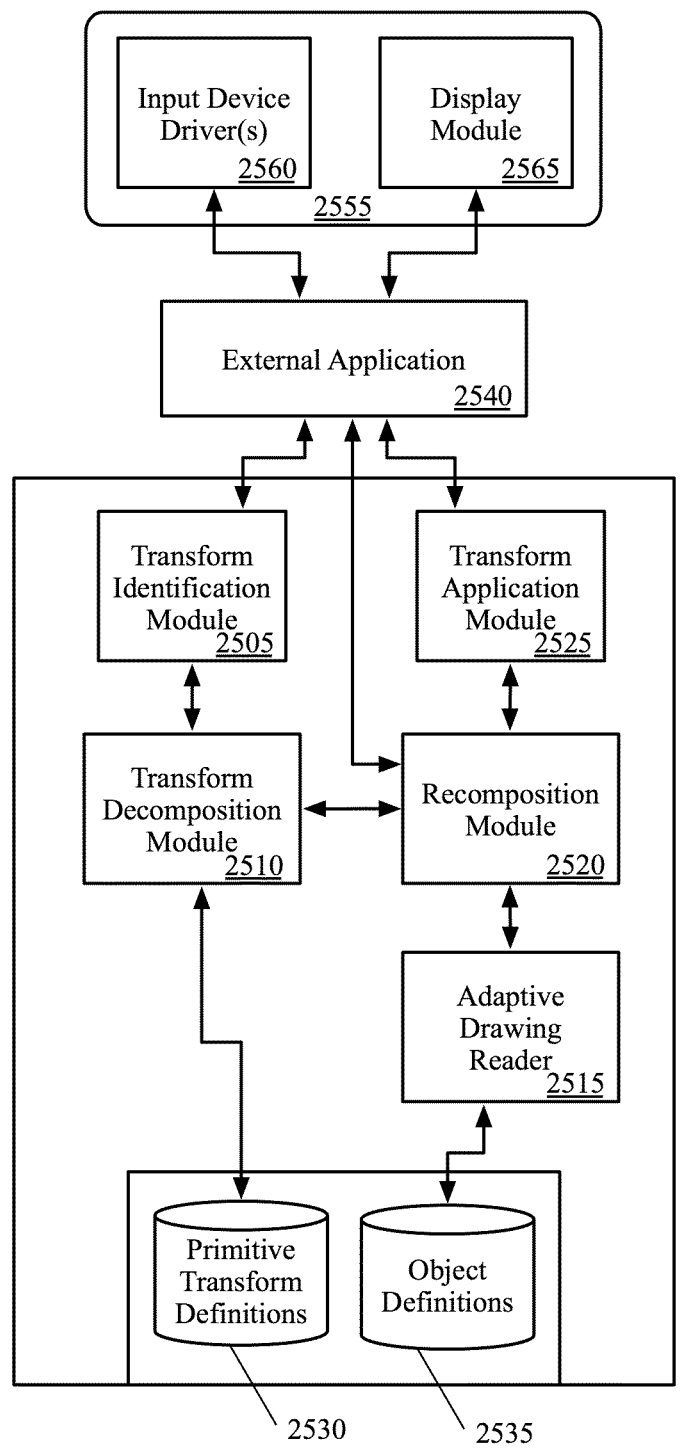
FIG. 25 conceptually illustrates the software architecture of a layout transformation module of some embodiments.

In some embodiments, the processes described above are implemented as software running on a particular machine, such as a computer or a handheld device, or stored in a computer readable medium. FIG. 25 conceptually illustrates the software architecture of a layout transformation module 2500 of some embodiments. In some embodiments, the various component modules are methods on an adaptive drawing object.

In some embodiments, the layout transformation module 2500 is a stand-alone application or is integrated into an application, while in other embodiments the application might be implemented within an operating system. Furthermore, in some embodiments, the module is provided as part of a server-based solution. In some such embodiments, the module is provided via a thin client. That is, the module runs on a server (e.g., as part of an application operating on the server) while a user interacts with the application via a separate machine remote from the server. In other such embodiments, the module is provided via a thick client. That is, the module is distributed from the server (e.g., as part of an application distributed from the server) to the client machine and runs on the client machine.

The layout transformation module 2500 includes a transform identification module 2505, a transform decomposition module 2510, an adaptive drawing reader 2515, a recomposition module 2520, and a transform application module 2525. In addition, the layout transformation module 2500 uses primitive transform definitions 2530 and object definitions 2535. The primitive transform definitions 2530 store definitions of one or more sets of primitive transforms that specify how to derive the primitive transforms from a generic transform for a particular class of transforms. The set of primitive transforms described above in Section I for 2D affine transforms, and the definitions of the associated parameters for the generic 2D affine transform, is one example of the information stored in the primitive transformation definitions 2530. In some embodiments, these primitive transform definitions are actually part of the transform decomposition module 2510 and are not stored separately.

The object definitions 2535 of some embodiments store definitions of adaptive drawing objects. These may include the definitions of the various graphic objects in a particular adaptive drawing object. The graphic object definitions may include definitions of the appearance of various objects, how a user interacts with the objects, and one or more sets of participation states for the objects that indicate whether the object participates in the different primitive transforms. In some embodiments, the primitive transform definitions 2530 and the object definitions 2535 are stored in one physical storage. In other embodiments, the definitions are stored in separate physical storages; the definitions of different graphic objects may even be stored in separate physical storages. The adaptive drawing objects may be stored in either a serialized format or an in-memory representation in different embodiments.

FIG. 25 also illustrates an operating system 2555 that includes input device driver(s) 2560 and display module 2565, as well as an external application 2540. In some embodiments, as mentioned, the layout transformation module 2500 is also part of the operating system 2555. In some embodiments, the adaptive drawing objects and its methods are part of a framework or software library that is part of the operating system. The input device drivers 2560 may include drivers for translating signals from a keyboard, mouse, touchpad, tablet, touchscreen, etc. A user interacts with one or more of these input devices, which send signals to their corresponding device driver. The device driver then translates the signals into user input data that is provided to the external application 2540.

The present patent application describes a number of different graphical user interfaces that provide users with numerous ways to perform different sets of operations and functionalities. In some embodiments, these operations and functionalities are performed based on different commands that are received from users through different input devices (e.g., keyboard, trackpad, touchpad, mouse, etc.). For example, some examples in the present application describe the use of a cursor in the graphical user interface to control (e.g., select, move) objects in the graphical user interface. However, in some embodiments, objects in the graphical user interface can also be controlled or manipulated through other controls, such as touch control (as illustrated in other examples in the present application). In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 2565 translates the output of a user interface for a display device. That is, the display module 2565 receives signals (e.g., from the external application 2540) describing what should be displayed and translates these signals into pixel information that is sent to the display device. The display device may be an LCD, plasma screen, CRT monitor, touchscreen, etc.

The external application 2540 may be any software agent that can use an adaptive drawing object. The external application receives input from the input device drivers (2560) or acts on its own to send a command through an API to act on an adaptive drawing object. The command may include one or more transforms to perform on the adaptive drawing object before displaying the object.

The transform identification module 2505 receives the command from the external application 2540 and identifies the transform being applied to the adaptive drawing object. In some embodiments, this entails identifying a matrix representation for the transform as well as a transform class to which the transform belongs. For instance, for a 2D affine transform, the transform identification module 2505 would identify variables a-f from Equation (1) and also would identify that the transform belongs to the class of 2D affine transforms. In some embodiments, the transform identification module 2505 is unnecessary because the command is passed as a function call to a particular method that performs a particular class of transform, with the function call having the variables of the transform as arguments.

The transform decomposition module 2510 receives the identified transform from the transform identification module 2505 and decomposes the module into its primitive transforms using a particular set of primitive transforms for the identified transform class. The decomposition module 2510 retrieves the primitive transform definitions from the storage 2530 in order to perform the decomposition. Using the example of a 2D affine transform, the decomposition module 2510 would retrieve the definitions of Equations (2)-(18) from storage 2530 and use these to identify matrix representations for the five transforms $T_1$-$T_5$. In some embodiments, multiple such modules are defined, each for a different set of primitive transforms for different transform classes (e.g., one module for 2D affine transforms, another module for orthographic transforms, another module for 3D perspective transforms, etc.).

The recomposition module 2520 generates a new transformation for each individual graphic object in the adaptive drawing object being modified. The recomposition module receives a list of graphic objects to which a particular transform is to be applied from the external application 2540 as well as the primitive transformations from the decomposition module 2510. The recomposition module generates the new transformation for a particular object based on the participation states of the object for the primitive transforms (e.g., as described above by reference to process 1900 of FIG. 19).

To identify the participation states for a particular graphic object as well as the transforms that have been applied leading up to the current transform, the recomposition module 2520 uses the adaptive drawing reader 2515. The adaptive drawing reader 2515 retrieves participation states and other operations applied to an object from the object definition 2535. As mentioned, these participation states may be stored in an array associated with the object in some embodiments, or are stored as a set of operations modifying a default state in which the object participates in all transforms. The adaptive drawing reader 2515 reads this information and passes data to the recomposition module 2520 indicating the primitive transforms in which the particular object participates and the current state of the particular object.

The transform application module 2525 applies the recomposed transforms to the graphic objects. That is, the transform application module receives a generated transform for a particular object from the recomposition module 2520 and applies the transform to the particular object. In some embodiments, this entails applying a matrix transformation to each point of the graphic object, or a particular set of points used to define the graphic object. The new display information for the graphic object is then passed to the UI interaction module 2540 for incorporation into a final layout.

While many of the features have been described as being performed by one module (e.g., the recomposition module 2520, the transformation module 2525, etc.), one of ordinary skill in the art will recognize that the functions described herein might be split up into multiple modules. Similarly, functions described as being performed by multiple different modules might be performed by a single module in some embodiments (e.g., the adaptive drawing reader 2515 and the recomposition module 2520 might be one module). Furthermore, one of ordinary skill will recognize that the modules shown might all be packaged together a various methods that are part of a single module.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 26:
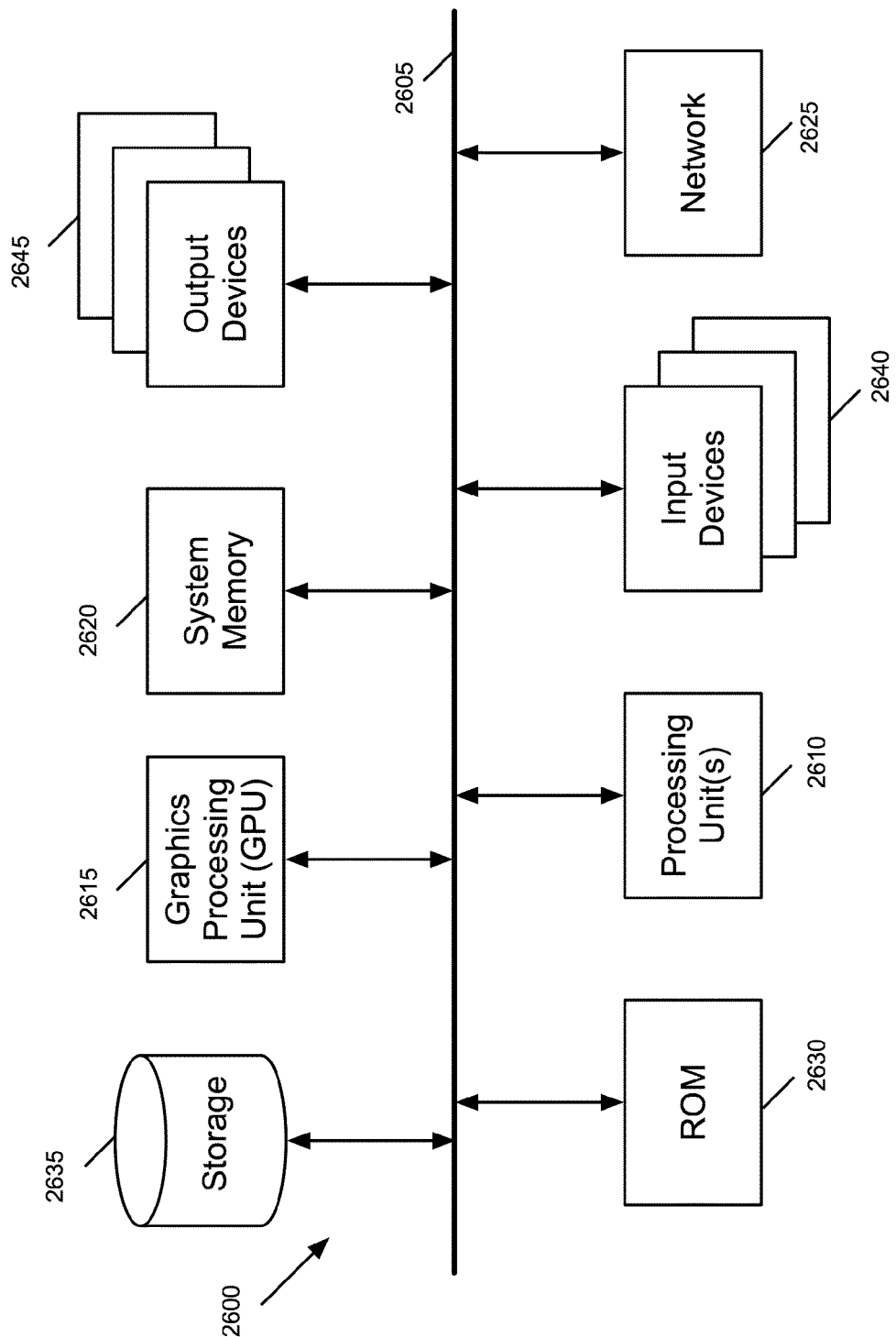
FIG. 26 conceptually illustrates an electronic system with which some embodiments of the invention are implemented.

FIG. 26 conceptually illustrates an electronic system 2600 with which some embodiments of the invention are implemented. The electronic system 2600 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2600 includes a bus 2605, processing unit(s) 2610, a graphics processing unit (GPU) 2615, a system memory 2620, a network 2625, a read-only memory 2630, a permanent storage device 2635, input devices 2640, and output devices 2645.

The bus 2605 collectively represents all system, peripheral, and chipset buses that communicatively connect the numerous internal devices of the electronic system 2600. For instance, the bus 2605 communicatively connects the processing unit(s) 2610 with the read-only memory 2630, the GPU 2615, the system memory 2620, and the permanent storage device 2635.

From these various memory units, the processing unit(s) 2610 retrieves instructions to execute and data to process in order to execute the processes of the invention. The processing unit(s) may be a single processor or a multi-core processor in different embodiments. Some instructions are passed to and executed by the GPU 2615. The GPU 2615 can offload various computations or complement the image processing provided by the processing unit(s) 2610. In some embodiments, such functionality can be provided using CoreImage's kernel shading language.

The read-only-memory (ROM) 2630 stores static data and instructions that are needed by the processing unit(s) 2610 and other modules of the electronic system. The permanent storage device 2635, on the other hand, is a read-and-write memory device. This device is a non-volatile memory unit that stores instructions and data even when the electronic system 2600 is off. Some embodiments of the invention use a mass-storage device (such as a magnetic or optical disk and its corresponding disk drive) as the permanent storage device 2635.

Other embodiments use a removable storage device (such as a floppy disk, flash memory device, etc., and its corresponding disk drive) as the permanent storage device. Like the permanent storage device 2635, the system memory 2620 is a read-and-write memory device. However, unlike storage device 2635, the system memory 2620 is a volatile read-and-write memory, such a random access memory. The system memory 2620 stores some of the instructions and data that the processor needs at runtime. In some embodiments, the invention's processes are stored in the system memory 2620, the permanent storage device 2635, and/or the read-only memory 2630. For example, the various memory units include instructions for processing multimedia clips in accordance with some embodiments. From these various memory units, the processing unit(s) 2610 retrieves instructions to execute and data to process in order to execute the processes of some embodiments.

The bus 2605 also connects to the input and output devices 2640 and 2645. The input devices 2640 enable the user to communicate information and select commands to the electronic system. The input devices 2640 include alphanumeric keyboards and pointing devices (also called "cursor control devices"), cameras (e.g., webcams), microphones or similar devices for receiving voice commands, etc. The output devices 2645 display images generated by the electronic system or otherwise output data. The output devices 2645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 26, bus 2605 also couples electronic system 2600 to a network 2625 through a network adapter (not shown). In this manner, the computer can be a part of a network of computers (such as a local area network ("LAN"), a wide area network ("WAN"), or an Intranet, or a network of networks, such as the Internet. Any or all components of electronic system 2600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2, 11, 14, 15, 17, and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory computer readable medium storing a computer program which when executed by at least one processor applies a transform to a graphic object in order to display the graphic object, the computer program comprising sets of instructions for:
    receiving the graphic object for display, the received graphic object comprising a plurality of pre-defined states that indicate whether the graphic object participates in each of a plurality of types of primitive transforms into which any affine transform can be decomposed;
    receiving an affine transform to apply to the graphic object;
    decomposing the affine transform into a primitive transform for each of the types of primitive transforms, wherein application of all of the primitive transforms in a particular order is equivalent to application of the received affine transform;
    applying, for each of the plurality of types of primitive transforms, the primitive transform to the graphic object according to the pre-defined state for the graphic object as received; and
    displaying the transformed graphic object after application of the primitive transforms in which the graphic object participates.

2. The non-transitory computer readable medium of claim 1, wherein the received affine transform is a two dimensional affine transform.

3. The non-transitory computer readable medium of claim 2, wherein the types of primitive transforms comprise a reflection transform, a rotation transform, a distortion transform, a scaling transform, and a translation transform.

4. The non-transitory computer readable medium of claim 3, wherein the primitive transforms account for a center of the graphic object.

5. The non-transitory computer readable medium of claim 1, wherein the received affine transform is a matrix operation and the primitive transforms are factors of the matrix operation.

6. The non-transitory computer readable medium of claim 1, wherein displaying the graphic object comprises displaying a layout that includes the graphic object.

7. The non-transitory computer readable medium of claim 6, wherein the layout comprises a second graphic object, the computer program further comprising a set of instructions for applying, for each of the types of plurality of primitive transforms, the primitive transform to the second graphic object according to a plurality of pre-defined states that indicate whether the second graphic object participates in each of the plurality of types of primitive transforms.

8. A method for applying a set of transforms to a group of graphic objects in a layout, the method comprising:
    for each transform in the set of transforms:
        factoring the transform into a plurality of primitive transforms;
        for each of the graphic objects in the group:
            for each of the plurality of primitive transforms, determining whether the graphic object is affected by the primitive transform, wherein different graphic objects in the group are affected by different sets of the plurality of primitive transforms based on different states for the graphic object that indicate whether each of the primitive transforms apply to the graphic object, wherein a particular graphic object in the group is affected by different sets of the plurality of primitive transforms for different transforms in the set of transforms;

generating a new transform from only the primitive transforms that affect the graphic object according to the different states for the graphic ; and applying the generated transform to the graphic object.

9. The method of claim 8, wherein generating the new transform for a particular graphic object comprises generating a composition of the primitive transforms that affect the particular graphic object.

10. The method of claim 8, wherein determining whether a particular graphic object is affected by a particular primitive transform comprises reading a value from an array associated with the particular graphic object that stores the states for the graphic object.

11. The method of claim 10, wherein the array comprises a binary value for each primitive transform.

12. The method of claim 8, wherein the transform is a two dimensional affine transform.

13. The method of claim 8 further comprising receiving the transform as a result of user interaction with the layout.

14. The method of claim 13, wherein the user interaction comprises interaction with the group of graphic objects.

15. The method of claim 13, wherein the user interaction comprises interaction with a different graphic object.

16. A non-transitory computer readable medium storing a computer program which when executed by at least one processor applies a transform to a set of grouped graphic objects, the computer program comprising sets of instructions for:

receiving an affine transform to apply to the set of grouped graphic objects;

decomposing the affine transform into a primitive transform for each of a plurality of types of primitive transforms, wherein application of all of the primitive transforms in a particular order is equivalent to application of the received affine transform;

determining, for each of the graphic objects in the set, a plurality of pre-defined states indicating whether each of the primitive transforms applies to the graphic object;

calculating, for each of the graphic objects in the set, a modified transform based on the primitive transforms that apply to the graphic object according to the pre-defined states for the graphic object; and applying the modified transforms to the respective graphic objects.

17. The non-transitory computer readable medium of claim 16, wherein the computer program exposes an application programming interface ("API") on the set of grouped graphic objects, and the affine transform is received from an application that displays the set of grouped graphic objects.

18. The non-transitory computer readable medium of claim 16, wherein the set of instructions for calculating the modified transform for a particular graphic object comprises sets of instructions for:

identifying a set of the primitive transforms to apply to the particular graphic object according to the pre-defined states for the graphic object; and calculating the modified transform by composing the set of the primitive transforms in the particular order.

19. The non-transitory computer readable medium of claim 18, wherein the particular order is pre-defined for the types of primitive transforms.

20. The non-transitory computer readable medium of claim 16, wherein the set of grouped graphic objects is stored in a software library as a single graphic object.

21. The non-transitory computer readable medium of claim 16, wherein the set of grouped graphic objects is a first set, wherein one of the graphic objects in the first set is a second set of grouped graphic objects.

22. The non-transitory computer readable medium of claim 21, wherein:

the set of instructions for determining a plurality of pre-defined states for the second set of grouped graphic objects comprises a set of instructions for determining a plurality of states for each of the graphic objects in the second set that indicates whether each of the primitive transforms applies to the graphic object, the plurality of states for a particular graphic object in the second set determined based on a set of pre-defined states for the particular graphic object stored with the second set of grouped graphic objects and modified by any changes to the set of states for the second set of grouped graphic objects stored with the first set of grouped graphic objects;

the set of instructions for calculating a modified transform for the second set of grouped graphic objects comprises a set of instructions for calculating, for each graphic object in the second set, a modified transform based on the primitive transforms that apply to the graphic object according to the states for the graphic object; and the set of instructions for applying the modified transform to the second set of grouped graphic objects comprises a set of instructions for applying, for each graphic object in the second set, a modified transform to the graphic object.

23. The non-transitory computer readable medium of claim 21, wherein one of the graphic objects in the second set is a third set of grouped graphic objects.

24. The non-transitory computer readable medium of claim 16, wherein the set of grouped graphic objects is stored as one of a file read by the computer program, a data stream read by the computer program, and a software resource packaged with the computer program.

25. The non-transitory computer readable medium of claim 24, wherein the computer program further comprises a set of instructions for applying, prior to decomposing the affine transform into a primitive transform for each of the plurality of types of primitive transforms, a set of transforms stored with the set of grouped graphic objects to the set of grouped graphic objects according to information stored with the set of grouped graphic objects.

26. The non-transitory computer readable medium of claim 25, wherein the set of instructions for determining the plurality of pre-defined states for each of the graphic objects in the set comprises identifying a set of states stored with the set of grouped graphic objects.

27. The non-transitory computer readable medium of claim 16, wherein the computer program is a software library.

* * * * *